(12) United States Patent
Iwamoto et al.

(10) Patent No.: US 9,300,208 B2
(45) Date of Patent: Mar. 29, 2016

(54) POWER CONVERTER WITH SWITCHED CURRENT SUPPLY CONTROL ELEMENT

(71) Applicant: DENSO CORPORATION, Kariya, Aichi-pref. (JP)

(72) Inventors: Fujiyuki Iwamoto, Nisshin (JP); Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 14/288,588

(22) Filed: May 28, 2014

(65) Prior Publication Data

US 2014/0354254 A1  Dec. 4, 2014

(30) Foreign Application Priority Data

May 30, 2013 (JP) .................................. 2013-114100
Apr. 3, 2014  (JP) .................................. 2014-077068

(51) Int. Cl.
  *H02M 3/158* (2006.01)
  *H02M 1/34* (2007.01)
(52) U.S. Cl.
  CPC ............. *H02M 3/158* (2013.01); *H02M 3/1588* (2013.01); *H02M 2001/342* (2013.01)
(58) Field of Classification Search
  CPC .............. H02M 3/158; H02M 3/1582; H02M 2001/0048; H02M 2001/0051; H02M 2001/0054; H02M 2001/0058
  USPC ........ 323/265, 271, 272, 282; 363/15, 16, 20, 363/21.01, 21.02, 21.03, 37, 131
  See application file for complete search history.

(56) References Cited

U.S. PATENT DOCUMENTS

| 5,057,990 A * | 10/1991 | Gulczynski ......... H02M 3/1582 363/131 |
| 2012/0069604 A1* | 3/2012 | Yagyu ..................... H02M 1/34 363/20 |
| 2012/0099348 A1* | 4/2012 | Umetani ............... H02M 3/158 363/37 |

FOREIGN PATENT DOCUMENTS

| JP | H08-275524 A | 10/1996 |
| JP | 2010-057236 A | 3/2010 |
| JP | 2010-200470 A | 9/2010 |
| JP | 2012-105499 A | 5/2012 |

OTHER PUBLICATIONS

Office Action mailed Oct. 6, 2015 in the corresponding JP application No. 2014-077068 (with English translation).

* cited by examiner

*Primary Examiner* — Adolf Berhane
*Assistant Examiner* — Jye-June Lee
(74) *Attorney, Agent, or Firm* — Posz Law Group, PLC

(57) ABSTRACT

A series circuit of a diode Da1, capacitors Ca1, Ca2 and a diode Da2 is connected in parallel to a series circuit of switching elements S1 and S2. A common junction between the capacitors Ca1 and Ca2 is connected to an emitter of the switching element S2. A series circuit of a switching element Sa1 and a diode Da3 is connected between a cathode of the diode Da1 and a cathode of the diode Da2. A series circuit of a diode Da4 and a switching element Sa2 is connected between an anode of the diode Da1 and the ground. A reactor La1 is connected between a source of the switching element Sa1 and a drain of the switching element Sa2.

15 Claims, 23 Drawing Sheets

POWER CONVERTER WITH SWITCHED CURRENT SUPPLY CONTROL ELEMENT

CROSS REFERENCE TO RELATED APPLICATION

This application is based on and incorporates herein by reference Japanese patent applications No. 2013-114100 filed on May 30, 2013 and No. 2014-077068 filed on Apr. 3, 2014.

FIELD

The present disclosure relates to a power converter for converting input power and outputting converted power by switching on and off a current supply control element in a main series circuit, which is formed of the current supply control element and either a further current supply control element or a rectifying element and connected to a main inductor at a common junction.

BACKGROUND

A switching power supply device, which is a power converter, is required to be compact in size. For size reduction, it is proposed to reduce size of, for example, passive elements used in the switching power supply device. For size reduction of the passive elements, it is proposed to increase a switching frequency. The increase in switching frequency causes an increase in switching loss. As a result, a power conversion efficiency is lowered.

In JP-A-2012-70467, for example, four semiconductor switches and one snubber capacitor is additionally provided in a switching power supply device, which is formed of a step-up and -down type chopper (bidirectional chopper or two-output chopper), so that the switching elements forming the bidirectional chopper are turned off with less loss.

However, according to the configuration of the above-referred patent document, the number of the semiconductor switches, which are main elements determining circuit cost, to be added is as many as four. Further, for driving two of them, two floating power sources, the reference potentials of which are different from the ground potential, need be added. In addition, large currents as large as a current of a reactor flow momentarily in those added switches when the switching elements turn off. For this reason, it is necessary to set a rated current of the added semiconductor switches to be as large as that of the main switching elements. This will add cost and increases a mounting area of a circuit.

SUMMARY

It is therefore an object to provide a power converter, which reduces turn-off loss of switching elements in a simple circuit configuration.

According to one aspect, a power converter comprises a main inductor, a main series circuit, a charge storing part, a current circulating part, an auxiliary inductor and an auxiliary switching element. The main series circuit is formed of a current supply control element and either a further current supply control element or a rectifying element connected to the current supply control element in series to the current supply control element at a common junction, which is connected to one end of the main inductor. The charge storing part has one end connected to the common junction of the main series circuit. The current circulating part is formed of a current circulating element or a current circulating circuit and connected between an other end of the charge storing part and at least one end of the main series circuit, for allowing a current to flow from a low potential side to a high potential side and preventing a current from flowing from the high potential side to the low potential side. The auxiliary inductor has one end connected to an other end side of the charge storing part. The auxiliary switching element is connected between an other end of the auxiliary inductor and one end of the main series circuit. The auxiliary switching element forms a loop path, which includes the current circulating part and the auxiliary inductor, when turned on.

BRIEF DESCRIPTION OF THE DRAWINGS

The above and other objects and features will become more apparent from the following detailed description made with reference to the accompanying drawings. In the drawings.

DETAILED DESCRIPTION OF THE EMBODIMENT

First Embodiment

Figure 1:
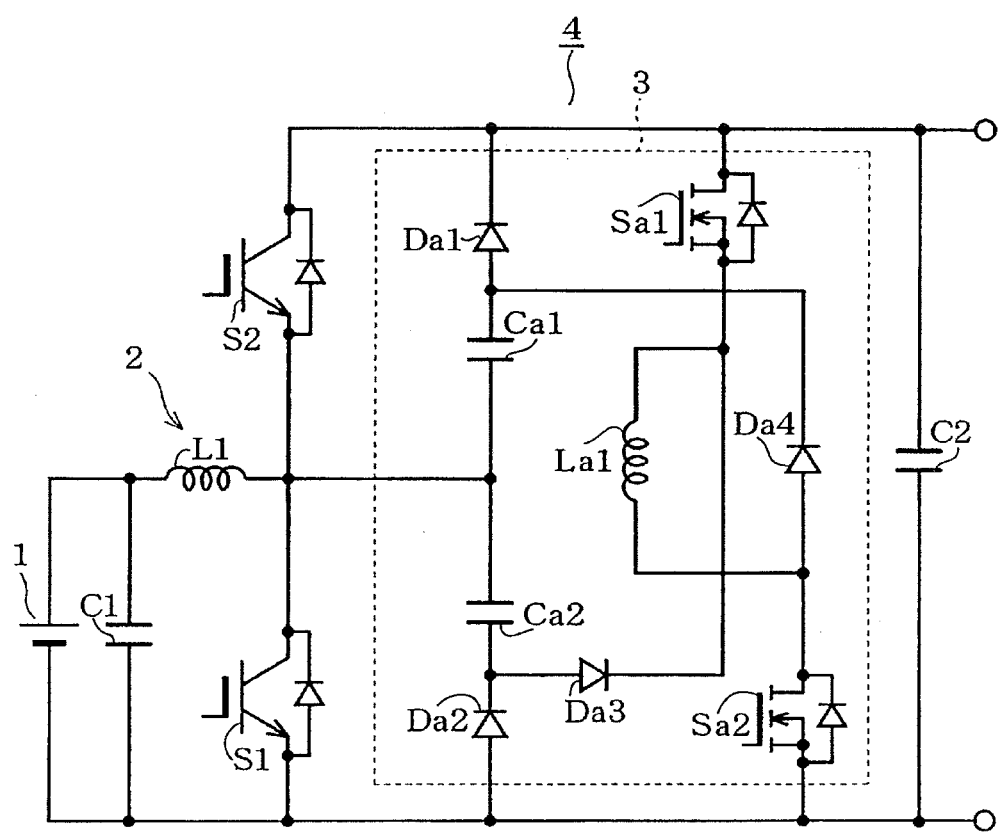
FIG. 1 is a circuit diagram showing a switching power supply device according to a first embodiment.

Referring to FIG. 1, an input-side capacitor C1 is connected to both ends of a DC power source (DC storage battery) 1. Two switching elements S1 and S2 (for example, IGBTs) are connected in series as current supply control elements. A reactor L1 (main inductor) is connected between a positive-side terminal of the DC power source 1 and an emitter of the switching element S2. A series circuit, which is formed of a reverse-biased diode Da1 (current circulating element), capacitors Ca1 and Ca2 (snubber capacitor, charge storing element, charge storing part) and a reverse-biased diode Da2 (current circulating element), is connected in parallel to the series circuit, which is formed of the switching elements S1 and S2. A common junction of the capacitors Ca1 and Ca2 is connected to the emitter of the switching element S2.

A series circuit, which is formed of a switching element (N-channel MOSFET) Sa1 (first auxiliary switching element) and a reverse-biased diode Da (current path forming element), is connected between a cathode of the diode Da1 and a cathode of the diode Da2. A series circuit, which is formed of a reverse-biased diode Da4 (current path forming element) and a switching element (N-channel MOSFET) Sa2, is connected between an anode of the diode Da1 and the ground. A reactor La1 (auxiliary inductor) is connected between a source of the switching element Sa1 and a drain of the switching element (second auxiliary switching element) Sa2. An output-side capacitor C2 is connected in parallel to the series circuit, which is formed of the switching elements S1 and S2.

The switching elements S1 and S2 and the reactor L1 thus form a step-up and -down chopper (two-output chopper or bidirectional chopper) 2. The circuit elements other than the capacitors C1 and C2, and the step-up and -down chopper form a loss reducing circuit 3. A switching power supply device 4 (power converter) is formed including those circuits and elements.

Figure 2:
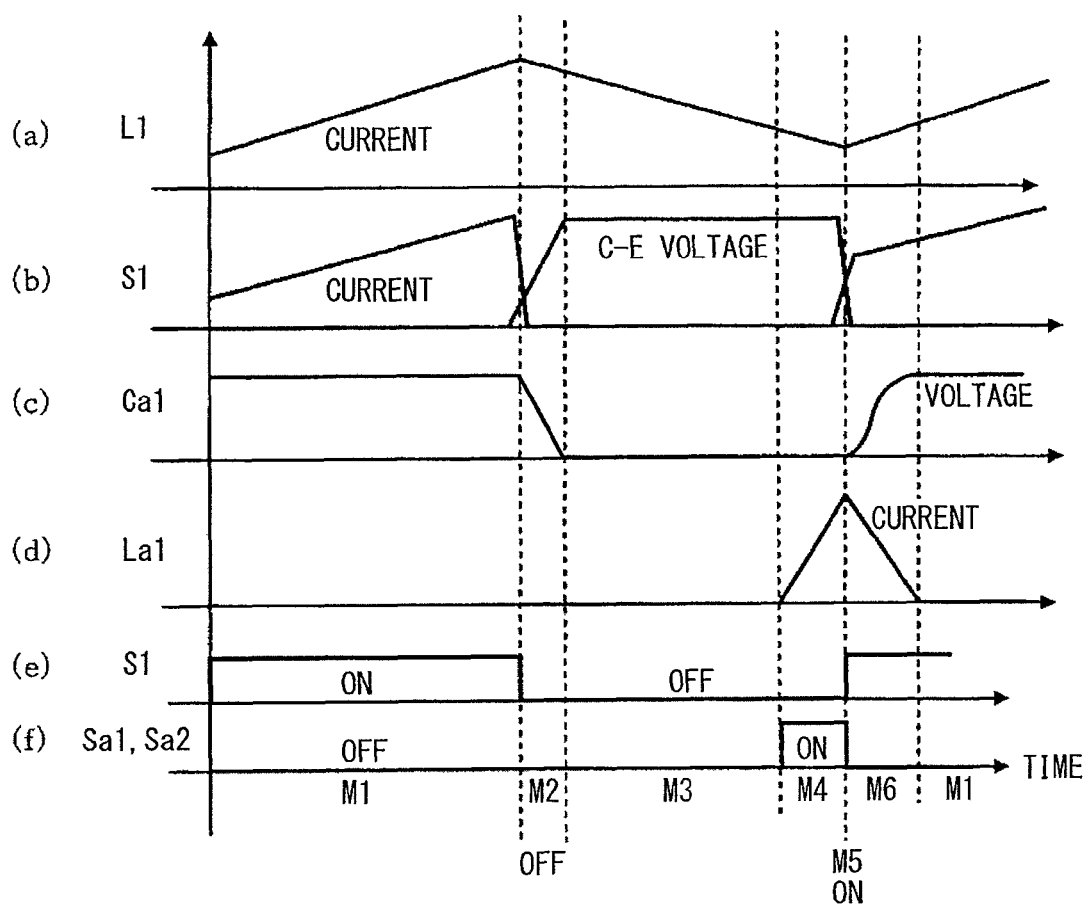
FIG. 2 is a timing diagram showing a voltage step-up operation.

An operation of the first embodiment will be described next. An operation period, in which the switching power supply device 4 performs a voltage step-up operation, is divided into six time periods M1 to M6 as shown in FIG. 2. The operation in each period will be described below.

<Voltage Step-Up Operation; Period M1>

Figure 3A:
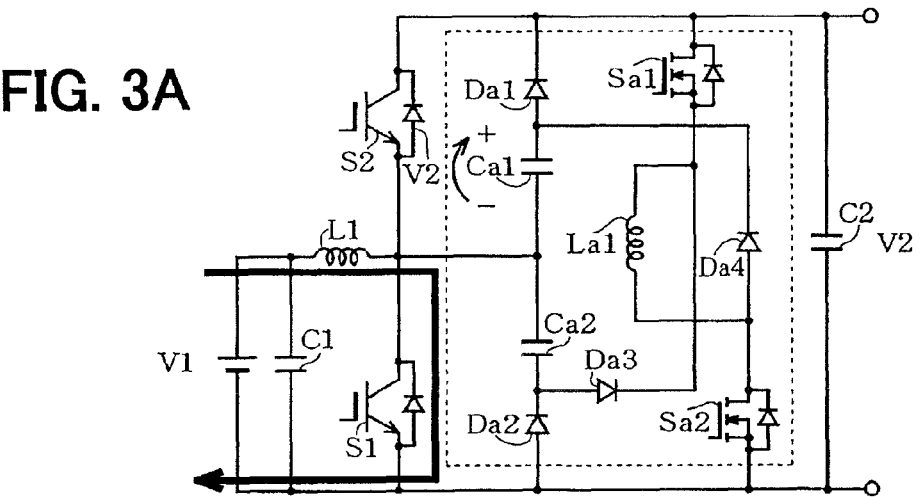
FIG. 3A, FIG. 3B and FIG. 3C are operation diagrams showing circuit currents, which flow in periods M1 to M3 in the timing diagram of FIG. 2.

As shown in FIG. 3A, the switching element S1 is in the on-state (FIG. 2, (e)), while the switching elements Sa1 and Sa2 are in the off state (FIG. 2, (f)). The reactor L1 is thus supplied with a current and stores magnetic energy therein (FIG. 2, (a)).

<Period M2>

Figure 3B:
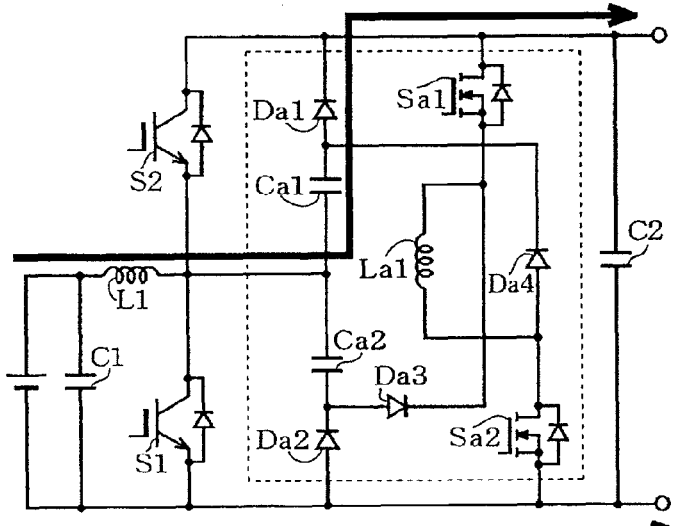

As shown in FIG. 3B, the switching element S1 is turned off (FIG. 2, (e)). A current is supplied from the reactor L1 to the output terminal side of the switching power supply device 4 through the capacitors Ca1 and the diode Da1. At this time, the electric charge stored in the capacitor Ca1 is discharged so that a collector-emitter voltage of the switching element S1 changes slowly (FIG. 2, (b)). Thus the switching loss at turn-off time is reduced.

<Period M3>

Figure 3C:
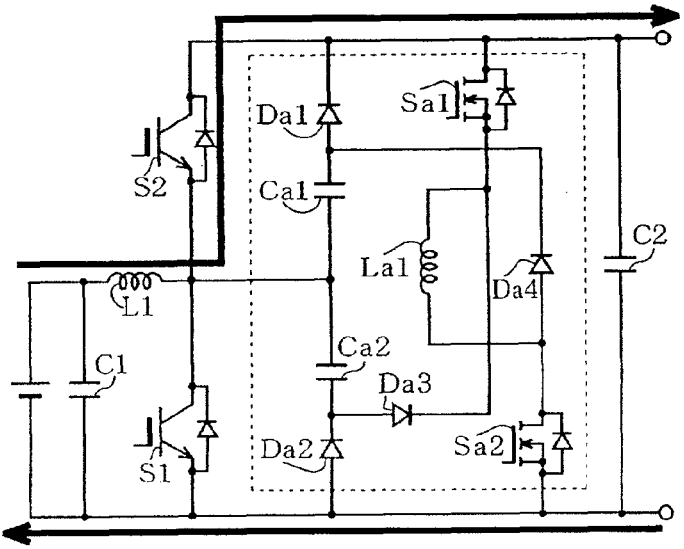

As shown in FIG. 3C, when the capacitor Ca1 finishes discharging (FIG. 2, (c)), the current flows from the reactor L1 to the output terminal side through a free-wheeling diode of the switching element S2.

<Period M4>

Figure 4A:
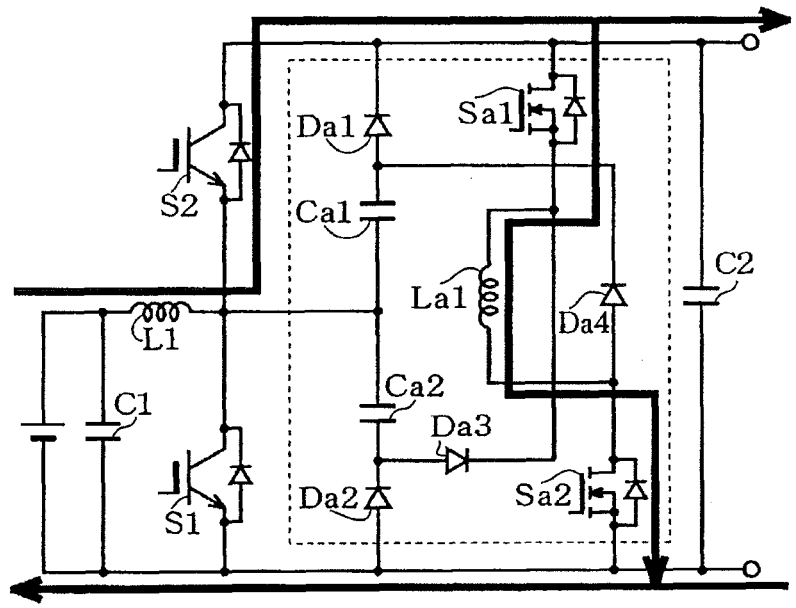
FIG. 4A and FIG. 4B are operation diagrams showing circuit currents, which flow in periods M4 and M6 in the timing diagram of FIG. 2.

As shown in FIG. 4A, the switching elements Sa1 and Sa2 are turned on (FIG. 2, (f)). A part of the current, which flows through the free-wheeling diode, is supplied to the reactor La1 (FIG. 2, (d)).

<Period M6>

Figure 4B:
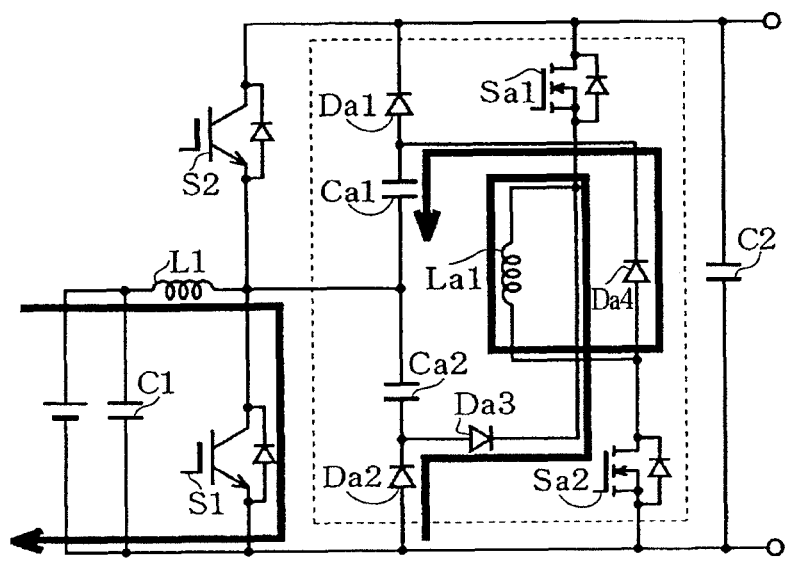

As shown in FIG. 4B, the switching element S1 is turned on (M5) and thereafter the switching elements Sa1 and Sa2 are turned off. In this case, the period for turning on the switching elements Sa1 and Sa2 are predetermined to a fixed time period, for example. The current flows in a path from the reactor La1 to the capacitor Ca1 through the diodes Da2 and Da1, the reactor La1 and the diode Da4. The capacitor Ca1 is charged until its terminal voltage reaches an output voltage V2 of the switching power supply device 4 (FIG. 2, (c)). In a case that magnetic energy still remains in the reactor La1 when the charging is finished, the current flows to the output terminal side through the diode Da1. Then the operation returns to the same operation as in the period M1.

Figure 5:
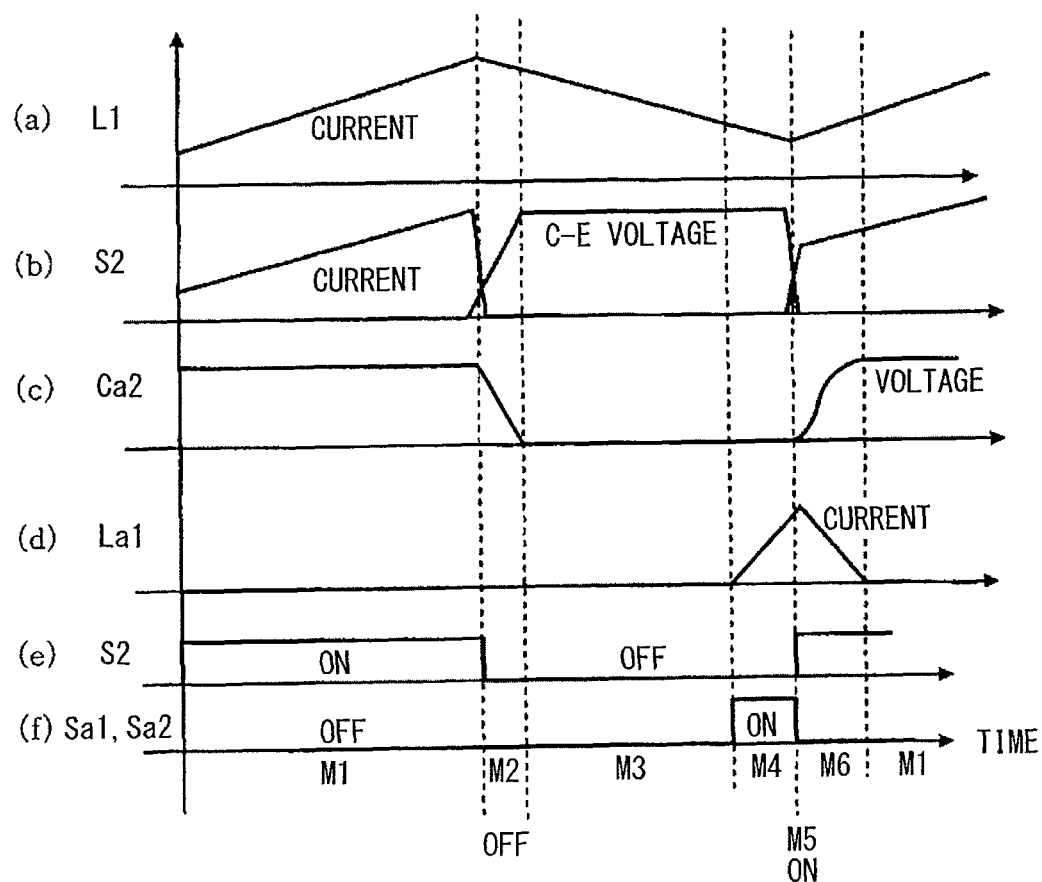
FIG. 5 is a timing diagram showing a voltage step-down operation.

As shown in FIG. 5, the step-down operation of the switching power supply device 4 will be described in the similar manner as described above.

<Voltage Step-Down Operation; Period M1>

Figure 6A:
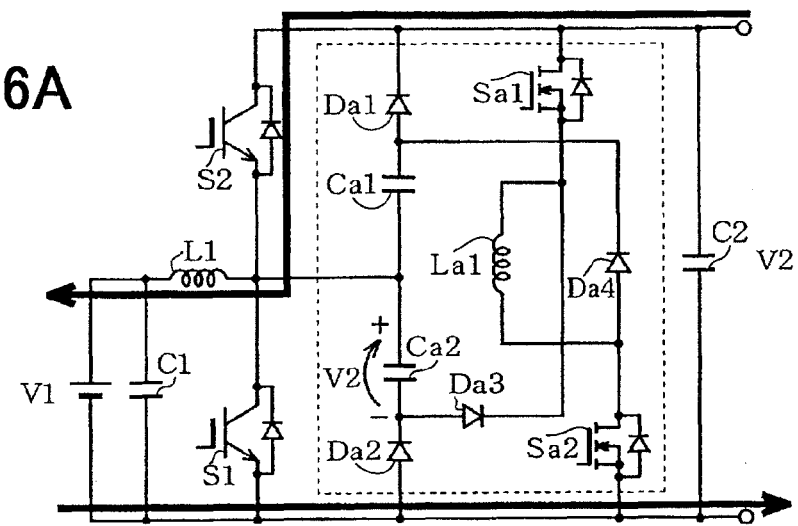
FIG. 6A, FIG. 6B and FIG. 6C are operation diagrams showing circuit currents, which flow in periods M1 to M3 in the timing diagram of FIG. 5.

As shown in FIG. 6A, the switching element S2 is in the on-state (FIG. 5, (e)) and the switching elements Sa1 and Sa2 are in the off-state (FIG. 5, (f)). The reactor L1 is supplied with a current from the output terminal side in a reverse direction to store magnetic energy (FIG. 5, (a)).

<Period M2>

Figure 6B:
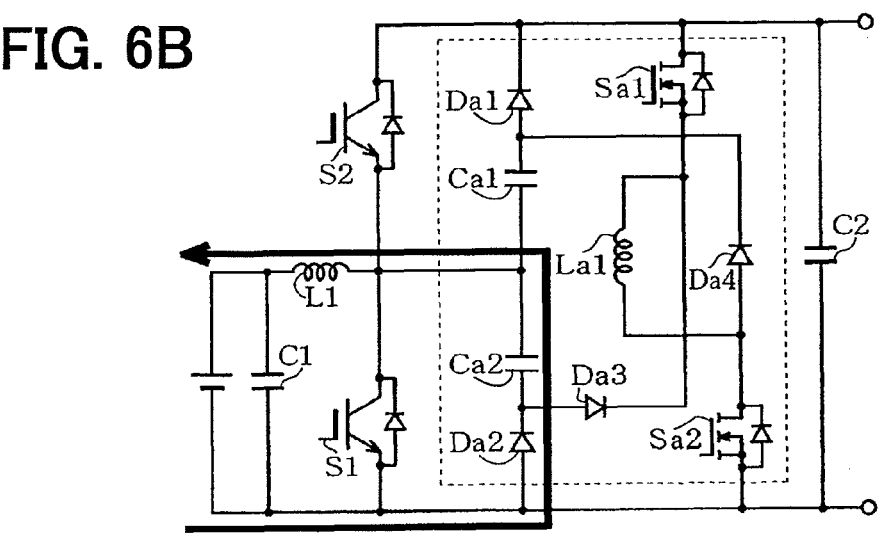

As shown in FIG. 6B, the switching element S2 is turned off. The current is supplied from the reactor L1, to the DC power source 1 side through the ground, the diode Da2, the capacitor Ca2 and the reactor L1. At this time, the electric charge stored in the capacitor Ca2 is discharged (FIG. 5, (c)) so that the collector-emitter voltage of the switching element S2 changes slowly (FIG. 5, (b)). Thus the switching loss at turn-off time is reduced.

<Period M3>

Figure 6C:
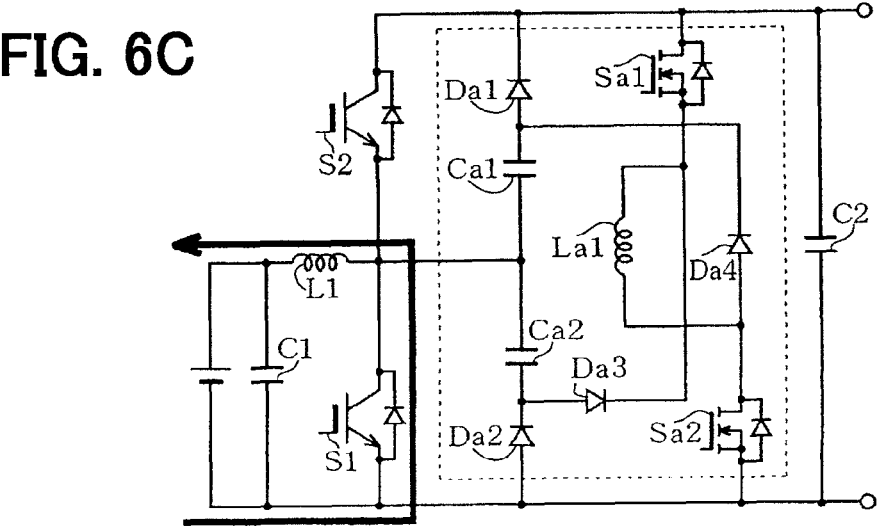

As shown in FIG. 6C, when the capacitor Ca2 finishes discharging, the current flows from the reactor L1 to the DC power source 1 side through the free-wheeling diode of the switching element S1.

<Period M4>

Figure 7A:
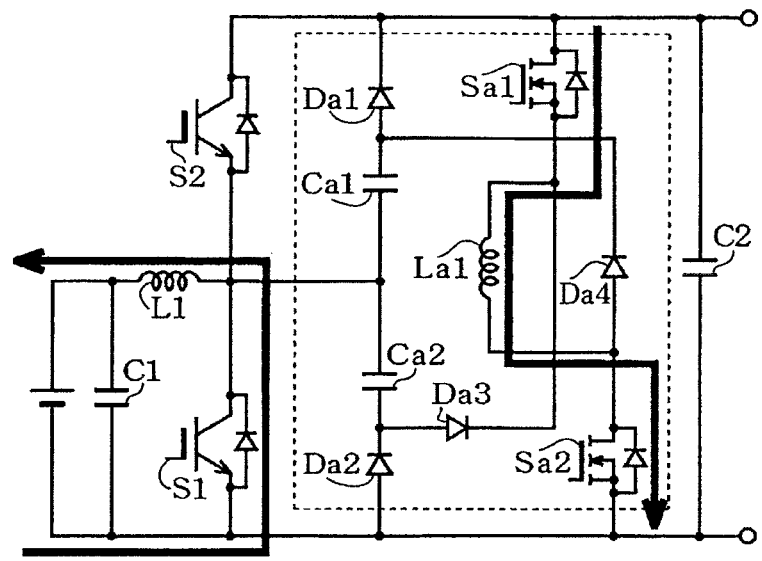
FIG. 7A and FIG. 7B are operation diagrams showing circuit currents, which flow in periods M4 and M6 in the timing diagram of FIG. 5.

As shown in FIG. 7A, the switching elements Sa1 and Sa2 are turned on (FIG. 5, (f)) so that the capacitor C2 is discharged to supply the current to the reactor La1 (FIG. 5, (d)).

<Period M6>

Figure 7B:
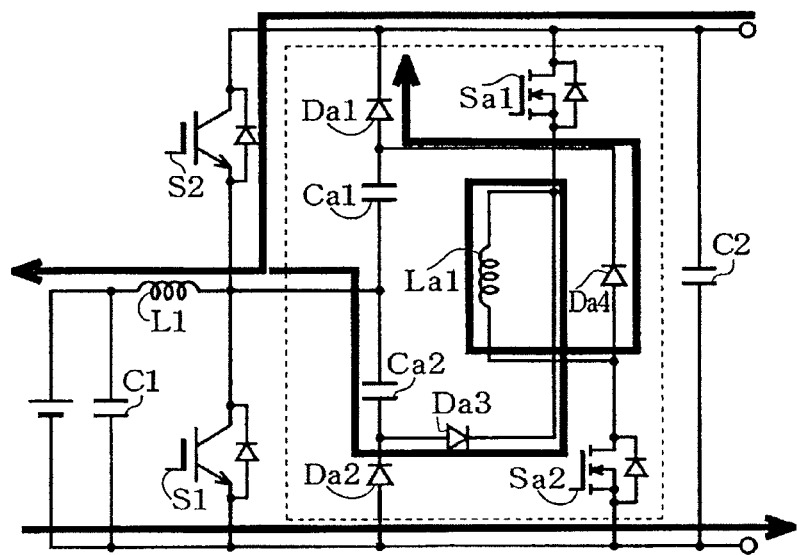

As shown in FIG. 7B, the switching element S2 is turned on (M5) and thereafter the switching elements Sa1 and Sa2 are turned off (FIG. 5, (e), (f)). In this case, the period for turning on the switching elements Sa1 and Sa2 also is predetermined to a fixed time period, for example. The current flows in a path from the reactor La1 to the diode Da1 through the diodes Da4 and Da1, the switching element S2 and the capacitor Ca2. The capacitor Ca2 is charged until its terminal voltage reaches the output voltage V2 of the switching power supply device 4 (FIG. 5, (c)). In a case that magnetic energy continues to remain in the reactor La1 when the charging is finished, the current flows to the input terminals side through the reactor L1. Then the operation returns to the same operation as in the period M1.

As described above, according to the first embodiment, when the switching element S1 is turned off in the voltage step-up operation, the current is supplied from the reactor L1 to the output terminal side of the switching power supply device 4 through the capacitor Ca1 and the diode Da1 so that the electric charge stored in the capacitor Ca1 is discharged. Thus the collector-emitter voltage of the switching element S1 is changed slowly so that the switching loss at the turn-off time is reduced.

When the capacitor Ca1 finishes its discharging, the switching elements Sa1 and Sa2 are turned on. A part of the current, which flows to the output terminal side through the free-wheeling diode of the switching element S2, is supplied to the reactor La1. By then turning off the switching elements S1 and S2 at the same time as or after turning on the switching element S1, the capacitor Ca1 is charged with the current of the reactor La1.

In the step-down operation, the current is supplied to the DC power source 1 side through the diode Da2 and the capacitor Ca2 when the switching element S2 is turned off. The electric charge of the capacitor Ca2 is thus discharged. The collector-emitter voltage of the switching element S2 is changed slowly and, as a result, the switching loss at the turn-off time is reduced.

After the capacitor Ca2 finishes discharging, the switching elements Sa1 and Sa2 are turned on to supply the current to the reactor La1. At the same time as or after turning on the switching element S2, the switching elements Sa1 and Sa2 are turned off so that the capacitor Ca2 is charged with the current of the reactor La1.

For this reason, the loss caused when the switching elements S1 and S2 are turned off can be reduced for both of the switching elements S1 and S2 in a simple circuit configuration, which uses less number of elements than in the conventional configuration and uses only one floating power source. Further, since the capacitors Ca1 and Ca2 are charged always with the current flowing in the reactor La1, the charging can be performed without loss if the loss caused when the auxiliary switches Sa1 and Sa2 are supplied with currents and the loss of the diodes Da1 to Da4 are ignored. Further, by limiting the period for the on-state of the switching elements Sa1 and Sa2 to a minimum value so that the minimum current sufficient to charge the capacitors Ca1 and Ca2 is accumulated in the reactor La1, the loss caused by the current flowing through the switching elements Sa1 and Sa2 can be reduced as much as possible.

Second Embodiment

Second and subsequent embodiments will be described simply by assigning the same reference numerals to the same parts as in the first embodiment so that only different parts will be described.

Figure 8:
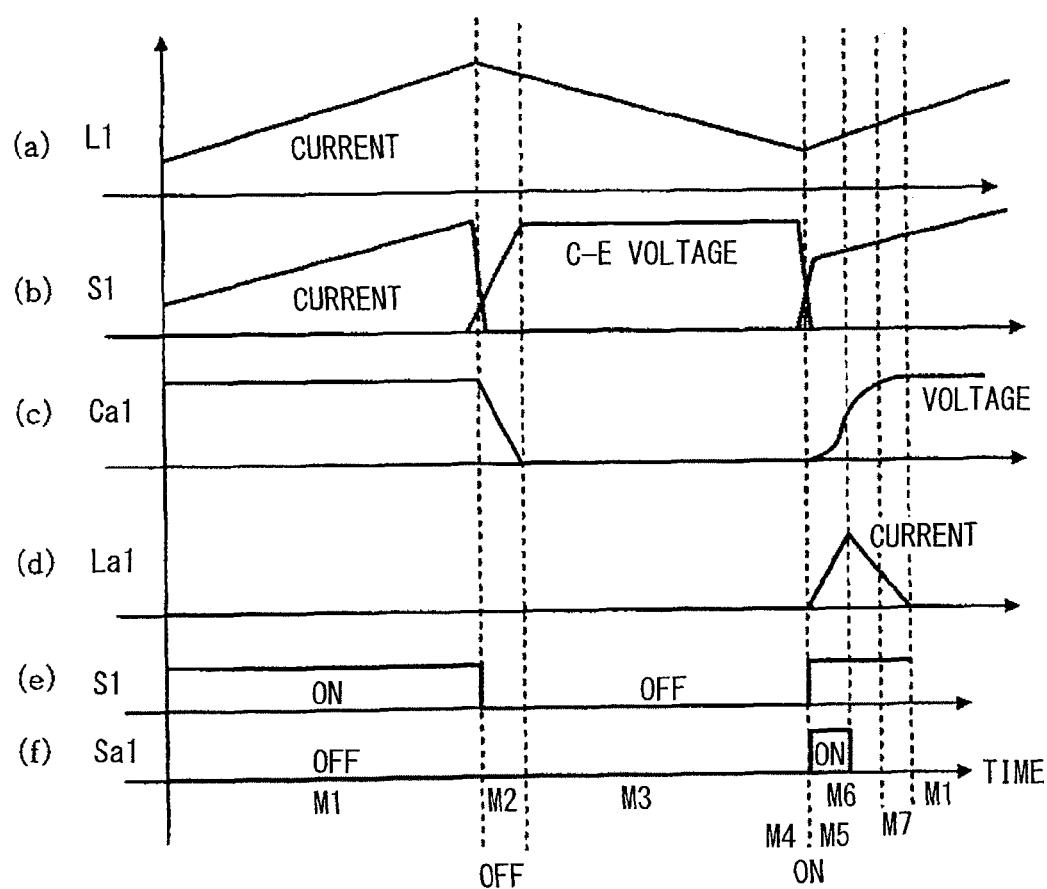
FIG. 8 is a timing diagram, which corresponds to FIG. 2, according to a second embodiment.

According to a second embodiment, as shown in FIG. 8, (f), only the switching element Sa1 is turned on at the time of the voltage step-up operation. The period is divided into M1 to M7. The switching pattern in the periods M1 to M3 is the same as that in the first embodiment.

<Voltage Step-Up Operation; Period M4>

Figure 9A:
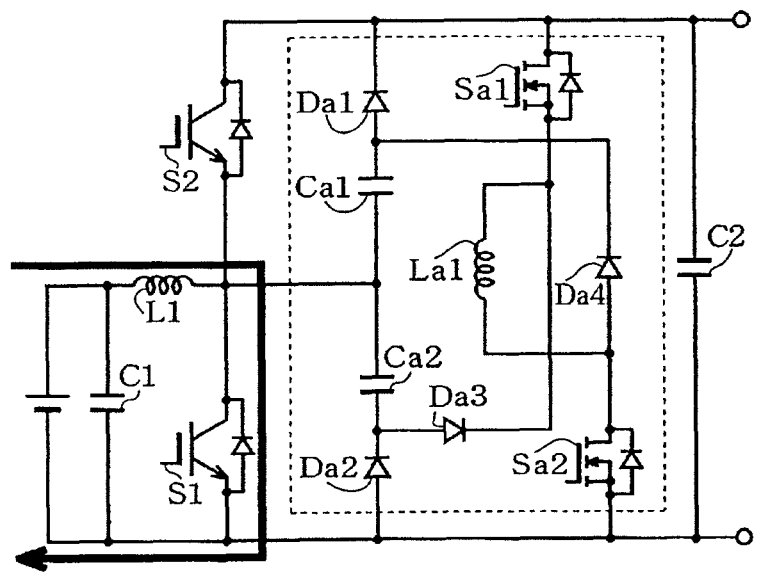
FIGS. 9A and 9B are operation diagrams showing circuit currents, which flow in periods M4 and M5 in the timing diagram of FIG. 8.

As shown in FIG. 9A, the switching element S1 is turned on (FIG. 8, (e)), although the switching elements Sa1 and Sa2 are turned on concurrently in this period in the first embodiment.

<Period M5>

Figure 9B:
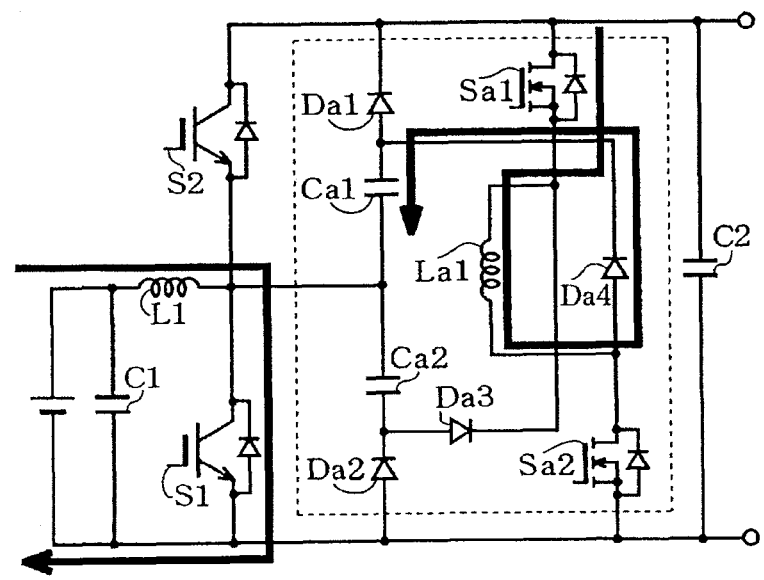

In the following period M5, as shown in FIG. 9B, the switching element Sa1 is turned on while maintaining the switching element S1 in the on-state (FIG. 8, (e), (f)). Thus the current flows from the switching element Sa1 to the capacitor Ca1 through the reactor La1 and the diode Da4 to charge the capacitor Ca1 (FIG. 8, (c)).

<Period M6>

Figure 10A:
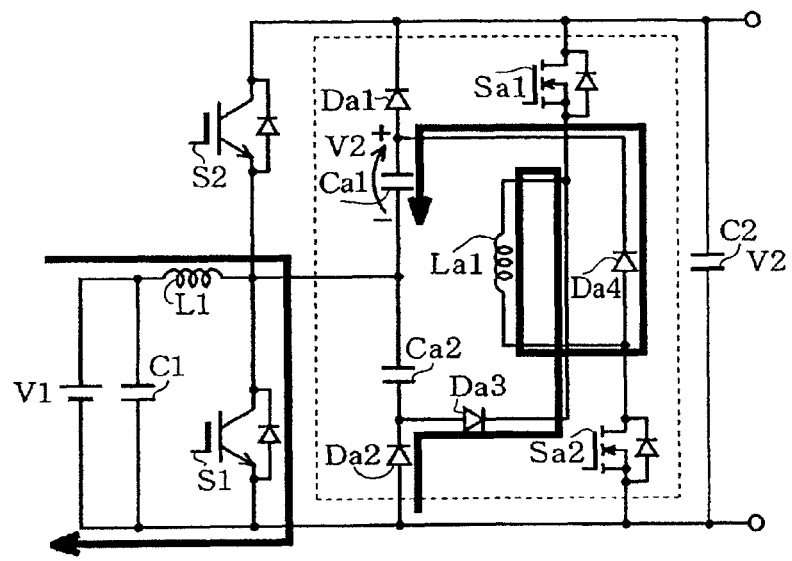
FIGS. 10A and 10B are operation diagrams showing circuit currents, which flow in periods M6 and M7 in the timing diagram of FIG. 8.

As shown in FIG. 10A, the switching element Sa1 is turned off while maintaining the switching element S1 in the on-state (FIG. 8, (e), (f)). The current flows from the diodes Da2 and Da3 to the capacitor Ca1 through the reactor La1 and the diode Da4. The capacitor Ca1 is thus charged until its terminal voltage reaches the output voltage V2 of the switching power supply device 4.

<Period M7>

Figure 10B:
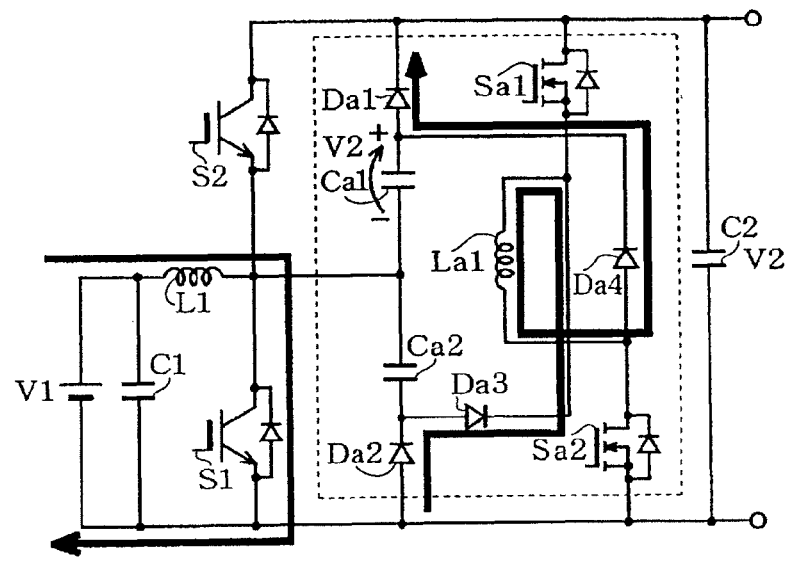

As shown in FIG. 10b, the switching pattern is the same as that in the period M6. In a case that magnetic energy still remains in the reactor La1 when the terminal voltage of the capacitor Ca1 reaches V2, the current flows from the diode Da4 to the output terminal side through the diode Da1. The operation returns to the same operation as in the period M1 when the magnetic energy of the reactor La1 is decreased to zero.

Figure 11:
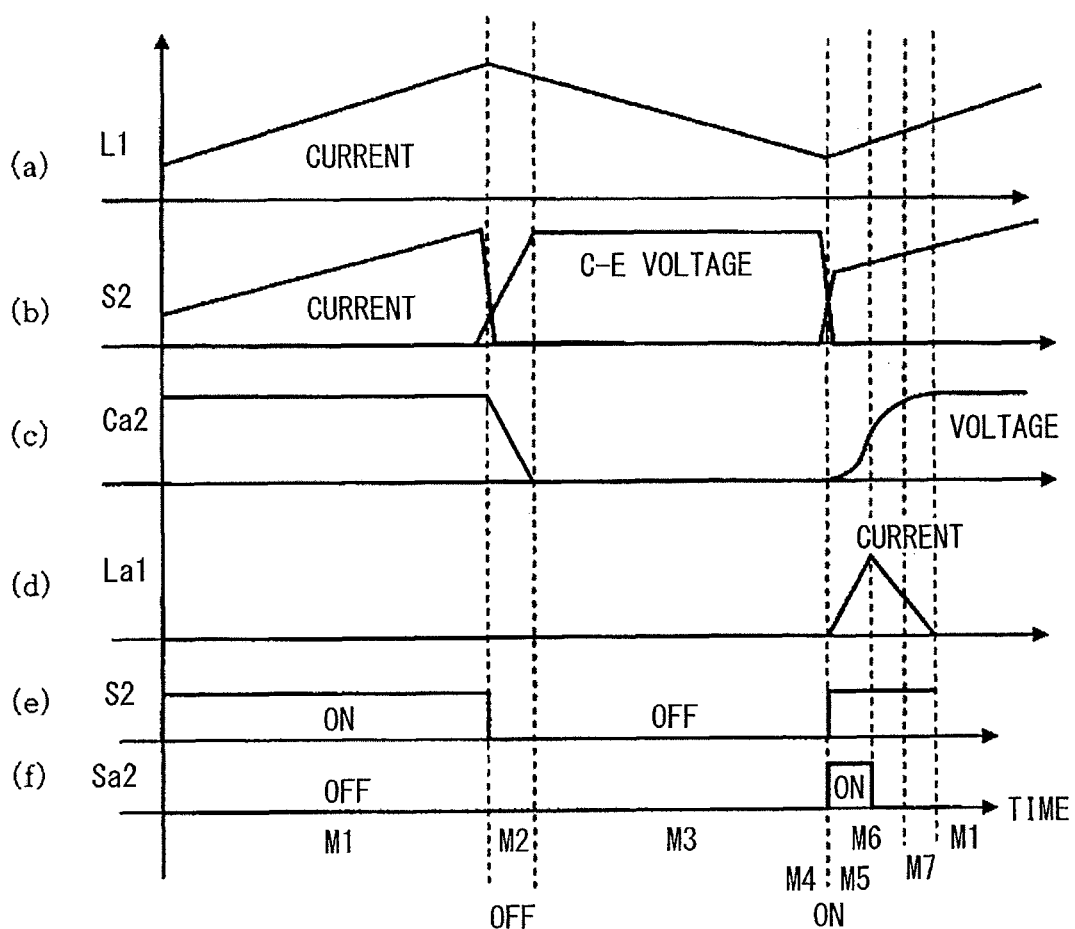
FIG. 11 is a timing diagram, which corresponds to FIG. 5.

In the voltage step-down operation shown in FIG. 11, only the switching element Sa2 is turned on (FIG. 11, (f)). The period is divided into M1 to M7, in which the switching pattern in the periods M1 to M3 is the same as that in the first embodiment.

<Voltage Step-Down Operation; Period M4>

Figure 12A:
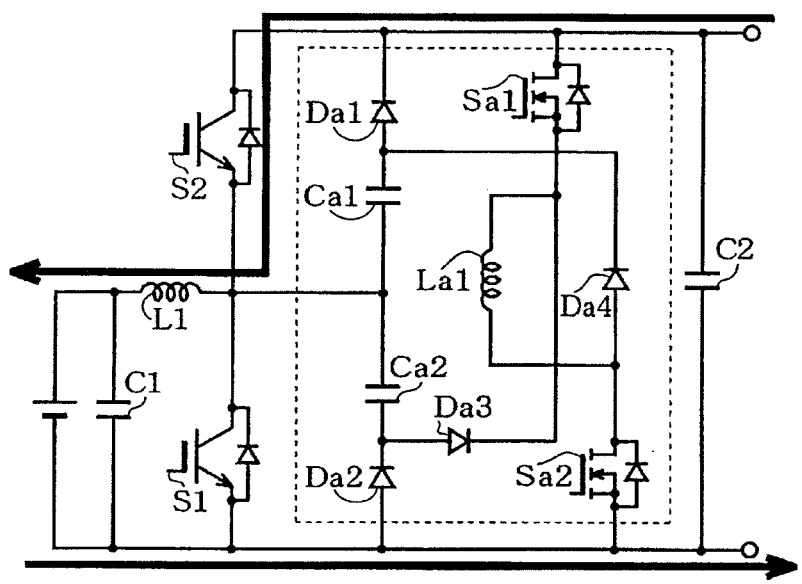
FIG. 12A and FIG. 12B are operation diagrams showing circuit currents, which flow in periods M4 and M5 in the timing diagram of FIG. 11.

As shown in FIG. 12A, the switching element S2 is turned on (FIG. 11, (e)), although the switching elements Sa1 and Sa2 are turned on in the first embodiment.

<Period M5>

Figure 12B:
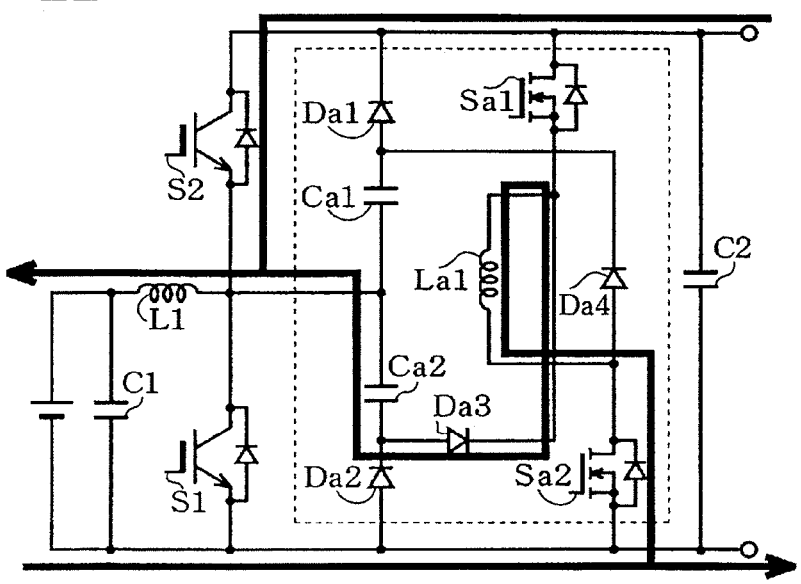

As shown in FIG. 12B, the switching element Sa2 is turned on (FIG. 11, (f) while maintaining the switching element S2 in the on-state. Thus the current flows from the switching element S2 to the ground through the capacitor Ca2, the diode Da3, the reactor La1 and the switching element Sa2 to charge the capacitor Ca2 (FIG. 11, (c)).

<Period M6>

Figure 13A:
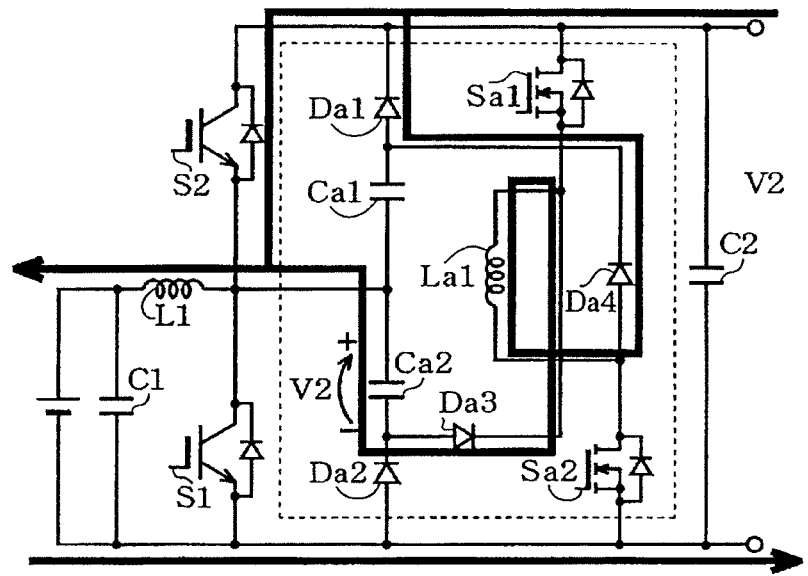
FIG. 13A and FIG. 13B are operation diagrams showing circuit currents, which flow in periods M6 and M7 in the timing diagram of FIG. 11.

As shown in FIG. 13A, the switching element Sa2 is turned off (FIG. 11, (f)) while maintaining the switching element S2 in the on-state. The current flows from the diodes Da4 and Da1 to the switching element S2 in place of the current flow path from the switching element Sa2 to the ground in the period M5. The capacitor Ca2 is thus charged continuously until its terminal voltage reaches the output voltage V2 of the switching power supply device 4 (FIG. 11, (c)).

<Period M7>

Figure 13B:
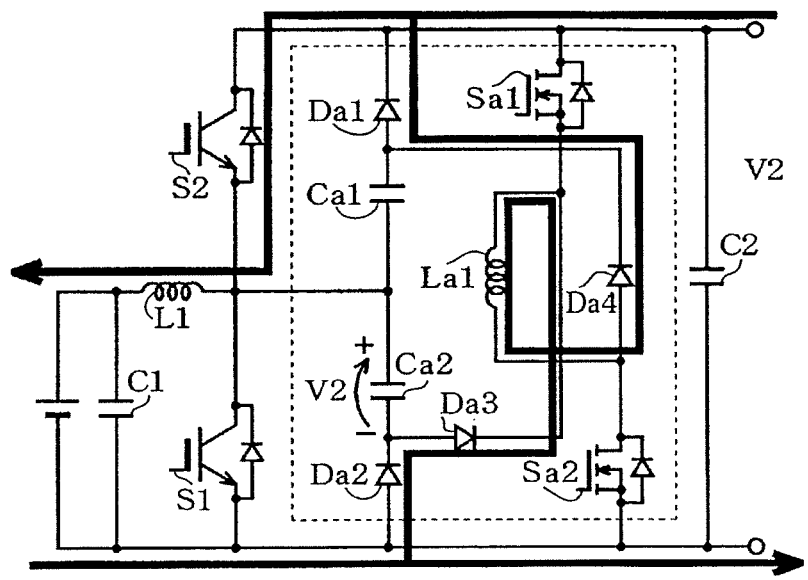

As shown in FIG. 13B, the switching pattern is the same as that in the period M6. In a case that magnetic energy still remains in the reactor La1 when the terminal voltage of the capacitor Ca2 reaches V2, the energy is restored to the DC power source 1 side from the diode Da1 through the switching element S2 (FIG. 11, (d)). The operation returns to the same operation as in the period M1 when the magnetic energy of the reactor La1 is decreased to zero.

According to the second embodiment, as described above, the switching element Sa1 is turned on while the switching element S1 is in the on-state to charge the capacitor Ca1 through the reactor La1 and the diode Da4 in the voltage step-up operation. While maintaining the switching element S1 in the on-state, the switching element Sa1 is turned off. The capacitor Ca1 is thus continuously charged through the diodes Da2 and Da3, the reactor La1 and the diode Da4.

The switching element Sa2 is turned on while the switching element S2 is in the on-state to charge the capacitor Ca2 with the current which flows through the capacitor Ca2, the diode Da3 and the reactor La1 in the voltage step-up operation. While maintaining the switching element S2 in the on-state, the switching element Sa2 is turned off. The capacitor Ca2 is thus continuously charged with the current flowing through the diodes Da4 and Da1 and the switching element S2. As a result, the same advantage as that in the first embodiment is provided.

In the first embodiment, power loss is caused in both of the switching elements Sa1 and sa2 at the turn-on time, because both of the switching elements Sa1 and sa2 are turned on. In the second embodiment, however, only one of the switching elements sa1 and Sa2 need be turned on, and hence a total of the power losses caused by the switching elements Sa1 and Sa2 can be suppressed. As a result, the efficiency of the switching power supply device 4 can be improved further.

Third Embodiment

Figure 14:
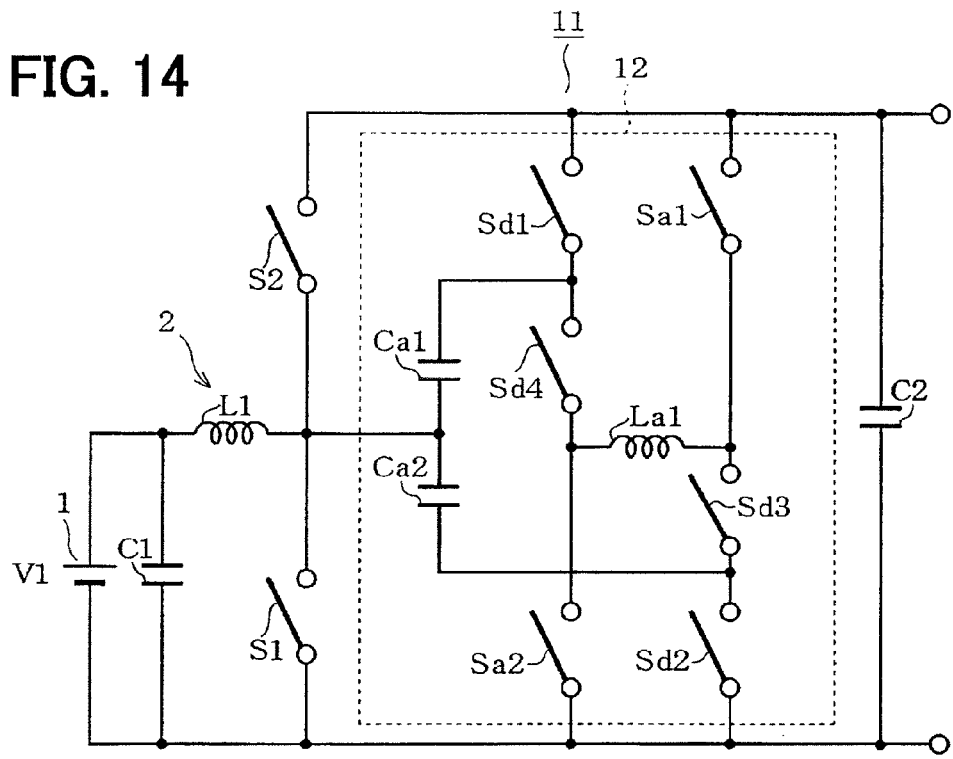
FIG. 14 is a circuit diagram, which corresponds to FIG. 1, according to a third embodiment.

As shown in FIG. 14, a switching power supply device 11 according to a third embodiment has a loss reducing circuit 12, in which the diodes Da1 to Da4 are replaced with switching elements Sd1 to Sd4 indicated as switches. The switching elements S1, S2, Sa1 and Sa2 are also indicated as switches. The switching elements Sd1 to Sd4 are turned on to supply the current at the timing when the current flows through the diode Da1 to Da4 in the above-described embodiments. With this configuration, the loss caused by the forward voltages when the current flows through the diodes Da1 to Da4 is reduced.

Fourth Embodiment

Figure 15:
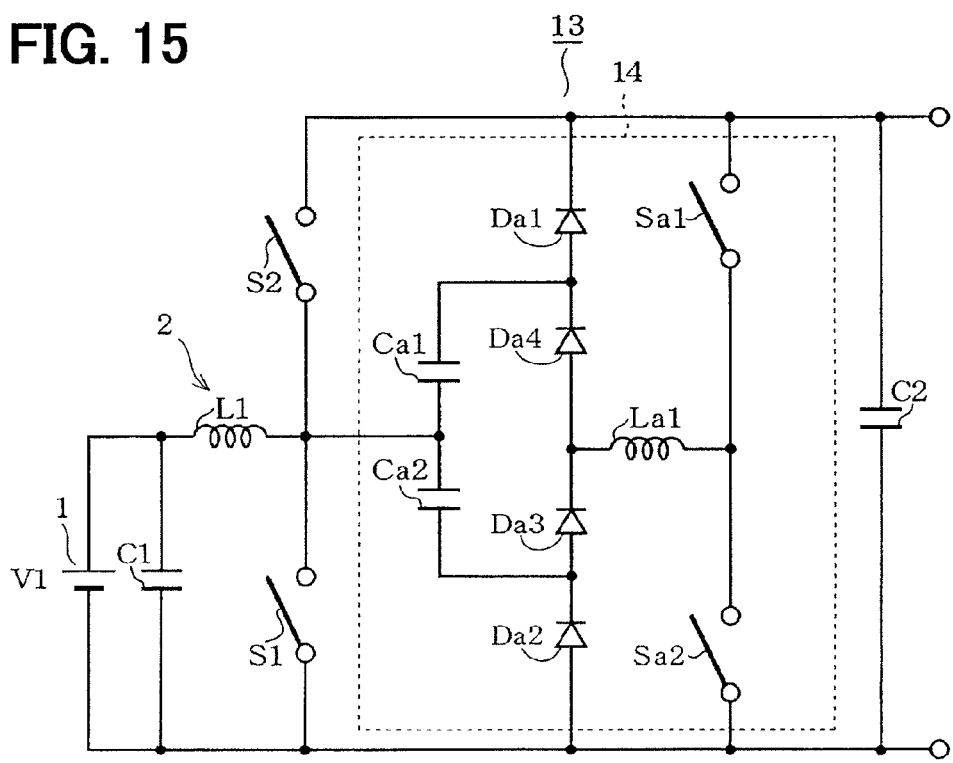
FIG. 15 is a circuit diagram, which corresponds to FIG. 1, according to a fourth embodiment.

As shown in FIG. 15, a switching power supply device 13 according to a fourth embodiment is different from the first embodiment in respect of the configuration of connection of elements at both ends of the reactor La1. That is, a series circuit formed of the diodes Da3 and Da2 is connected between an anode of the diode Da4 and the ground. The switching element Sa2 is connected in series with the switching element Sa1. That is, a loss reducing circuit 14 is formed by replacing the position of connection of the diodes Da3 and Da2 with the switching element Sa2. In the case of the switching power supply device 13, the switching pattern, which is applicable, is limited to that of the second embodiment. In the fourth embodiment as well, the loss of switching elements S1 and S2 at the turn-off time can be reduced. Similarly to the second embodiment, the total of the power loss caused by the switching elements Sa1 and Sa2 can be suppressed in comparison to the first embodiment and the efficiency of the switching power supply device 13 can be improved further.

Fifth Embodiment

Figure 16A:
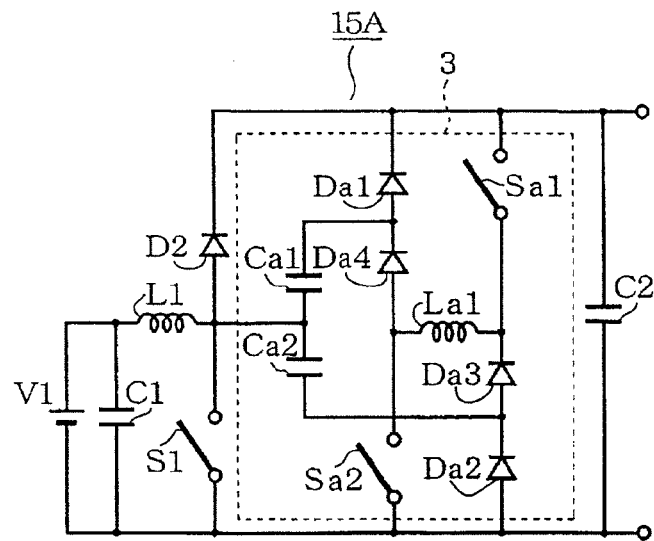
FIG. 16A, FIG. 16B and FIG. 16C are circuit diagrams, which correspond to FIG. 1, according to a fifth embodiment.
Figure 16B:
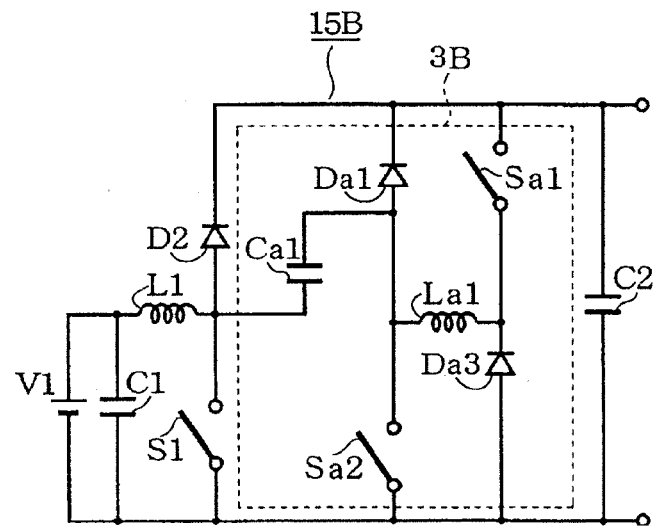
Figure 16C:
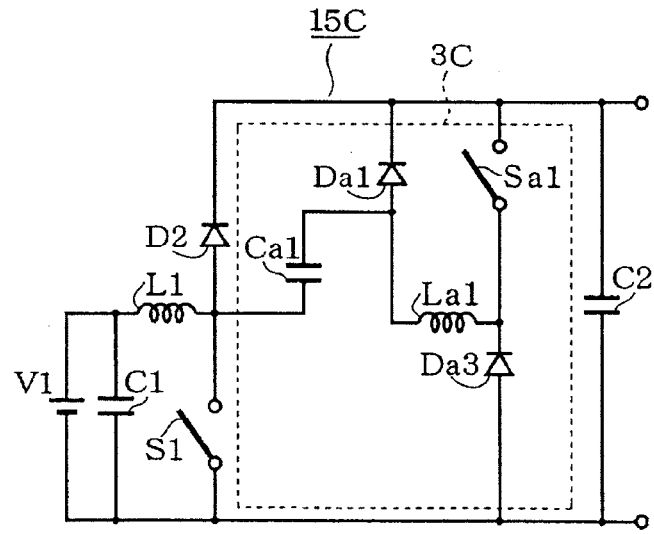

As shown in FIG. 16A, FIG. 16B and FIG. 16C, each of switching power supply devices 15A, 15B and 15C is formed as a voltage step-up choppers (unidirectional chopper or one-output chopper). The switching element S2 is replaced with the diode D2 (current supply control element). In the switching power supply device 15A, in which only the above-described replacement is made as shown in FIG. 16A, the capacitor Ca2 and the diode Da2 are provided redundantly. For this reason, the switching power supply device 15B is formed as shown in FIG. 16B. This switching power supply device 15B is provided with a loss reducing circuit 3B, in which the capacitor Ca2 and the diode Da2 are removed.

The switching power supply device 15C shown in FIG. 16C is provided with a loss reducing circuit 3C, in which the switching element Sa2 is removed from the switching power supply device 15B. Loss of the switching element S1 at the turn-off time can be reduced in the switching power supply devices 15A, 15B and 15C, which are formed as the unidirectional voltage step-up choppers. However, since the switching element Sa2 is removed in the switching power supply device 15C, the operation is limited to that of the second embodiment.

In the switching power supply device 15C, it is possible to remove further the diode Da3 from the loss reducing circuit 3C. In such a case, the magnetic energy stored in the reactor La1 cannot be supplied as a current when the switching element Sa1 is turned off. Instead, the switching element Sa1 generates a surge to convert the energy to the loss. The loss thus increases correspondingly. For this reason, the switching element Sa1 is continuously turned on until the current of the reactor La1 fully disappears.

Sixth Embodiment

Figure 17A:
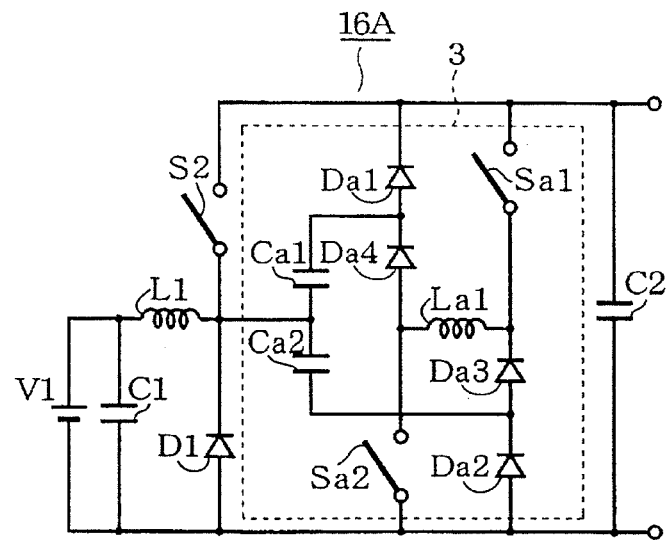
FIG. 17A, FIG. 17B and FIG. 17C are circuit diagrams, which correspond to FIG. 1, according to a sixth embodiment.
Figure 17B:
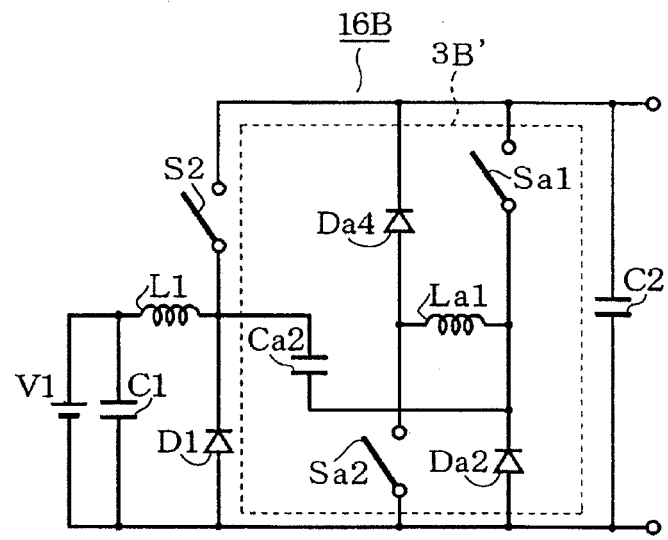
Figure 17C:
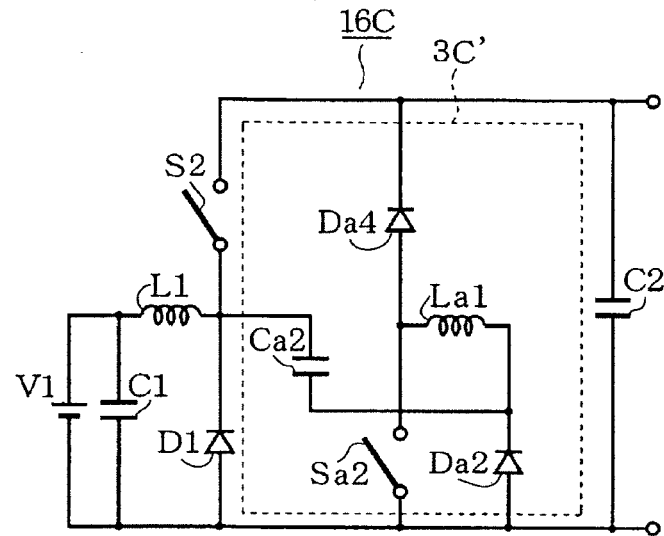

As shown in FIG. 17A, FIG. 17B and FIG. 17C, each of switching power supply devices 16A, 16B and 16C according to a sixth embodiment is formed as voltage step-down choppers. The switching element S1 is replaced with a diode D1 (current supply control element). In the switching power supply device 16A, in which the diode D1 is used as shown in FIG. 17A, the capacitor Ca1 and the diode Da1 are provided redundantly. For this reason, the switching power supply device 16B is formed as shown in FIG. 17B. This switching power supply device 16B is provided with a loss reducing circuit 3B', in which the capacitor Ca1 and the diode Da1 are removed.

The switching power supply device 16C shown in FIG. 17C is provided with a loss reducing circuit 3C', in which the switching element Sa1 is removed from the switching power supply device 16B. Loss of the switching element S2 at the turn-off time can be reduced in the switching power supply device 16, which is formed as the unidirectional voltage step-down chopper. However, since the switching element Sa1 is removed in the switching power supply device 16C, the operation is limited to that of the second embodiment.

In the switching power supply device 16C, it is possible to remove further the diode Da4 from the loss reducing circuit 3C'. In such a case, the magnetic energy stored in the reactor La1 cannot be supplied as a current when the switching element Sa2 is turned off. The loss increases correspondingly. For this reason, the switching element Sa2 is continuously turned on until the current of the reactor La1 fully disappears.

Seventh Embodiment

Figure 18:
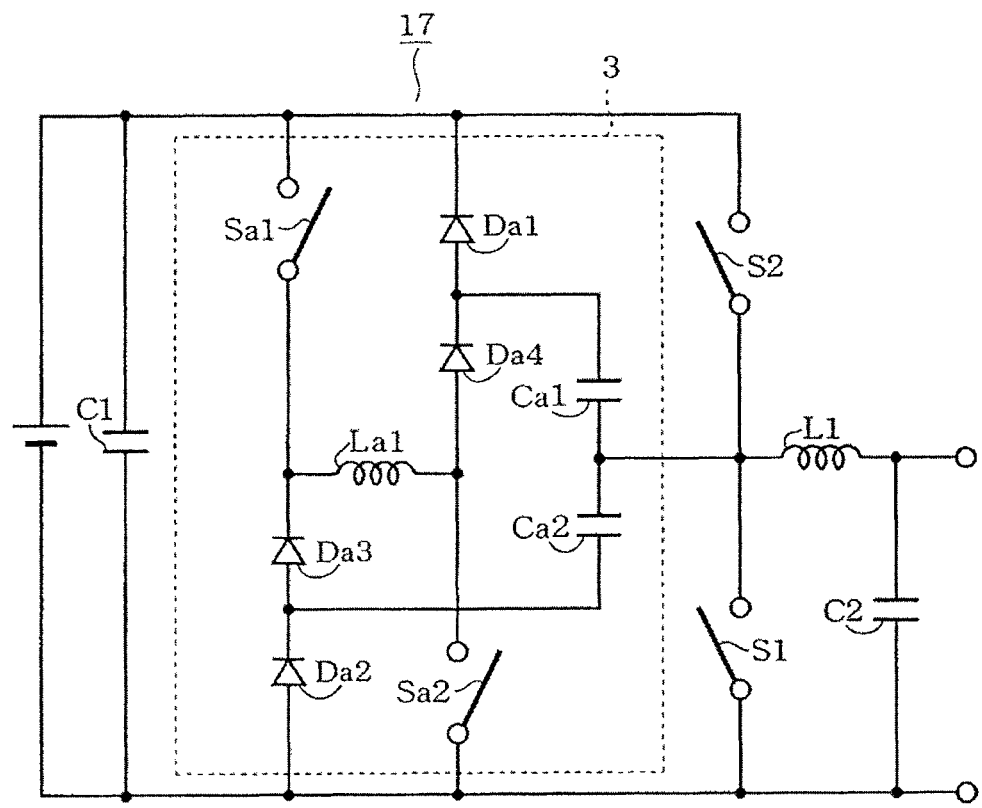
FIG. 18 is a circuit diagram, which corresponds to FIG. 1, according to a seventh embodiment.

As shown in FIG. 18, a switching power supply device 17 according to a seventh embodiment is formed as a bidirectional voltage step-down chopper. The loss reducing circuit 3 is connected in parallel to the input-side capacitor C1. A series circuit formed of the switching elements S1 and S2 is connected at the input side thereof in parallel to the loss reducing circuit 3. The common junction between the capacitors Ca1 and Ca2 is connected to the common junction between the switching elements S1 and S2. The reactor L1 is connected between the common junction and the capacitor C2. With this configuration, loss caused when the switching elements S1 and S2 are turned off can be reduced by the loss reducing circuit 3. The operation and advantage of the switching power supply device 17 are the same as those of the first embodiment and the second embodiment. The advantages of the third to the sixth embodiments, to which the first embodiment is applied, can similarly be provided by applying the third through sixth embodiments to the seventh embodiment.

Eighth Embodiment

Figure 19:
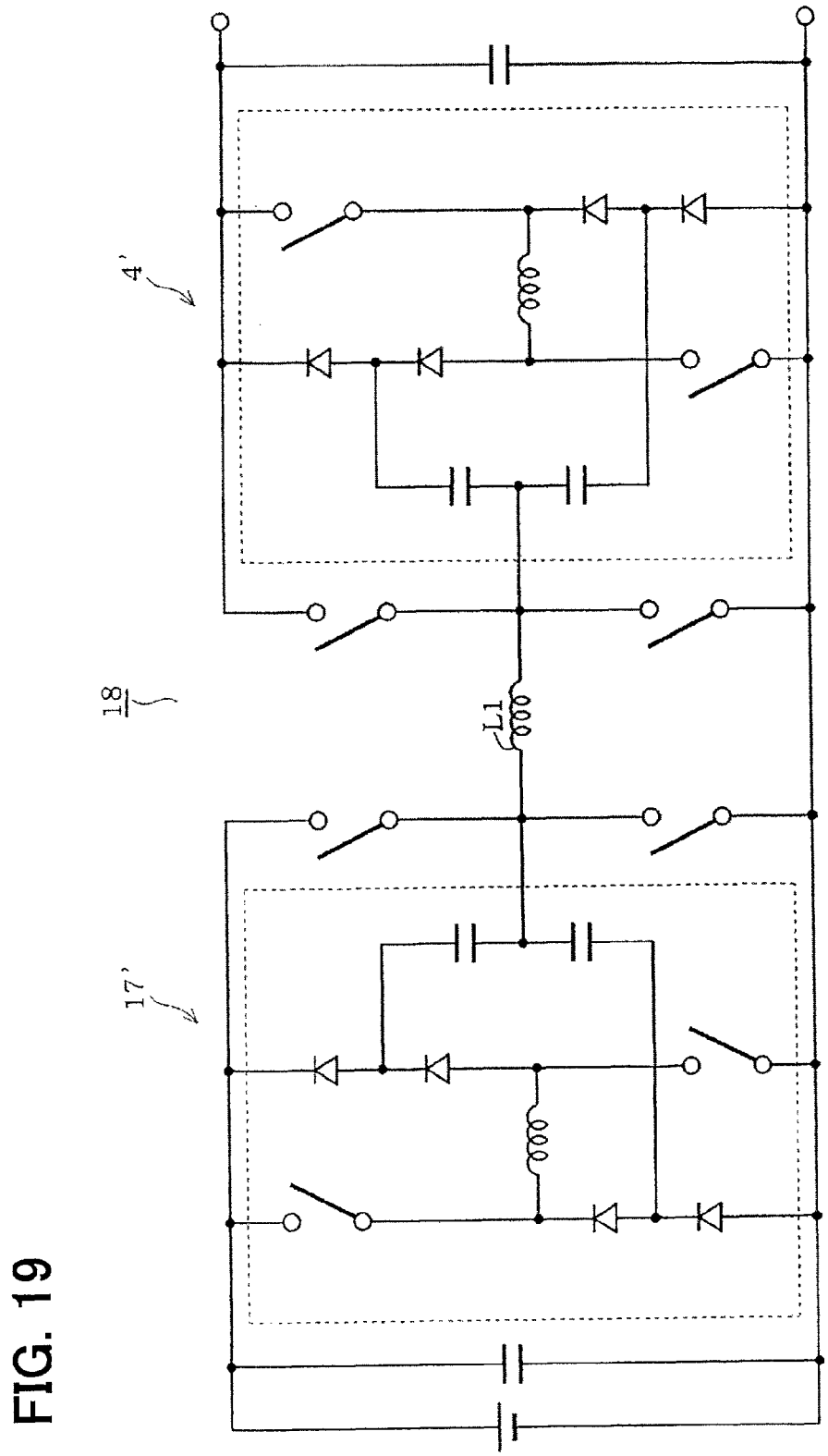
FIG. 19 is a circuit diagram, which corresponds to FIG. 1, according to an eighth embodiment.

As shown in FIG. 19, a switching power supply device 18 according to an eighth embodiment is formed as a bidirectional voltage step-up and -down chopper. At its input side, an input-side chopper 17', which is formed by removing the capacitor C2 from the switching power supply device 17 according to the seventh embodiment, is arranged. At its output side, an output-side chopper 4', which is formed by removing the DC power source 1 and the capacitor C1 from the switching power supply device 4 according to the first embodiment, is arranged. The reactor L1 connects an output terminal of the input-side chopper 17' and an input terminal of the output-side chopper 4'. The switching power supply device 18, which is formed as the bidirectional voltage step-up and -down chopper, can also reduce loss caused when the switching elements S1 and S2 of the choppers 17' and 4' are turned off. The operation and advantage of each chopper 17', 4' is the same as the second embodiment and the seventh embodiment. The third to the sixth embodiments, to which the first embodiment is applied, may be applied similarly to the choppers 17' and 4' so that similar advantage can be provided.

Ninth Embodiment

Figure 20:
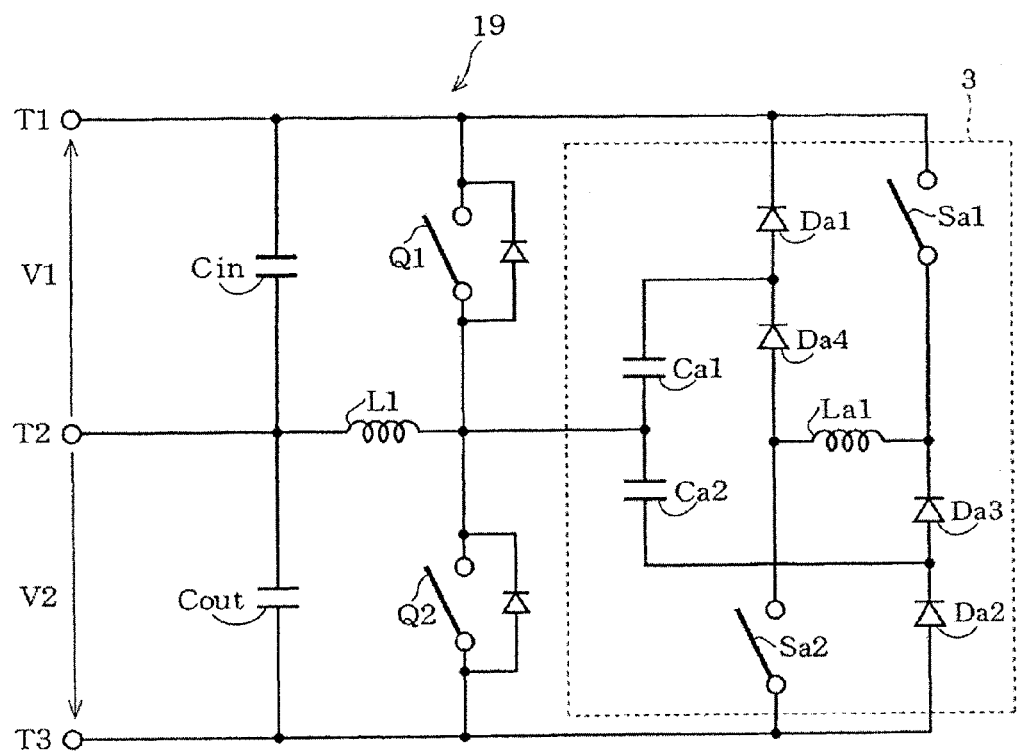
FIG. 20 is a circuit diagram, which corresponds to FIG. 1, according to a ninth embodiment.

As shown in FIG. 20, a switching power supply device 19 according to a ninth embodiment is formed as a bidirectional inverting step-up and step-down chopper. In a case that terminals T1 and T2 form input terminals, terminals T2 and T3 form output terminals. A capacitor Cin is connected between the terminals T1 and T2 and a capacitor Cout is connected between the terminals T2 and T3. A series circuit formed of switching elements Q1 and Q2 is connected between the terminals T1 and T3. The reactor L1 is connected between a common junction between the switching elements Q1 and Q2 and the terminal T2.

The loss reducing circuit 3 is connected in parallel to the series circuit formed of the switching elements Q1 and Q2. The common junction of the series circuit is connected to a common junction between the capacitors Ca1 and Ca2. After the switching element Q1 side is turned on to supply the current to the reactor L1 and then turned off, a current flows to charge the capacitor Cout through a free-wheeling diode of the switching element Q2. The output voltage V2 thus becomes opposite in polarity to the input voltage V1.

After the switching element Q2 side is turned on to supply the current to the reactor L1 and then turned off, a current flows to charge the capacitor Cin through a free-wheeling diode of the switching element Q1. The output voltage V1 thus becomes opposite in polarity to the output voltage V2. The switching power supply device 19 configured as described above can also reduce turn-off loss of the switching elements Q1 and Q2 by the loss reducing circuit 3.

Tenth Embodiment

Figure 21:
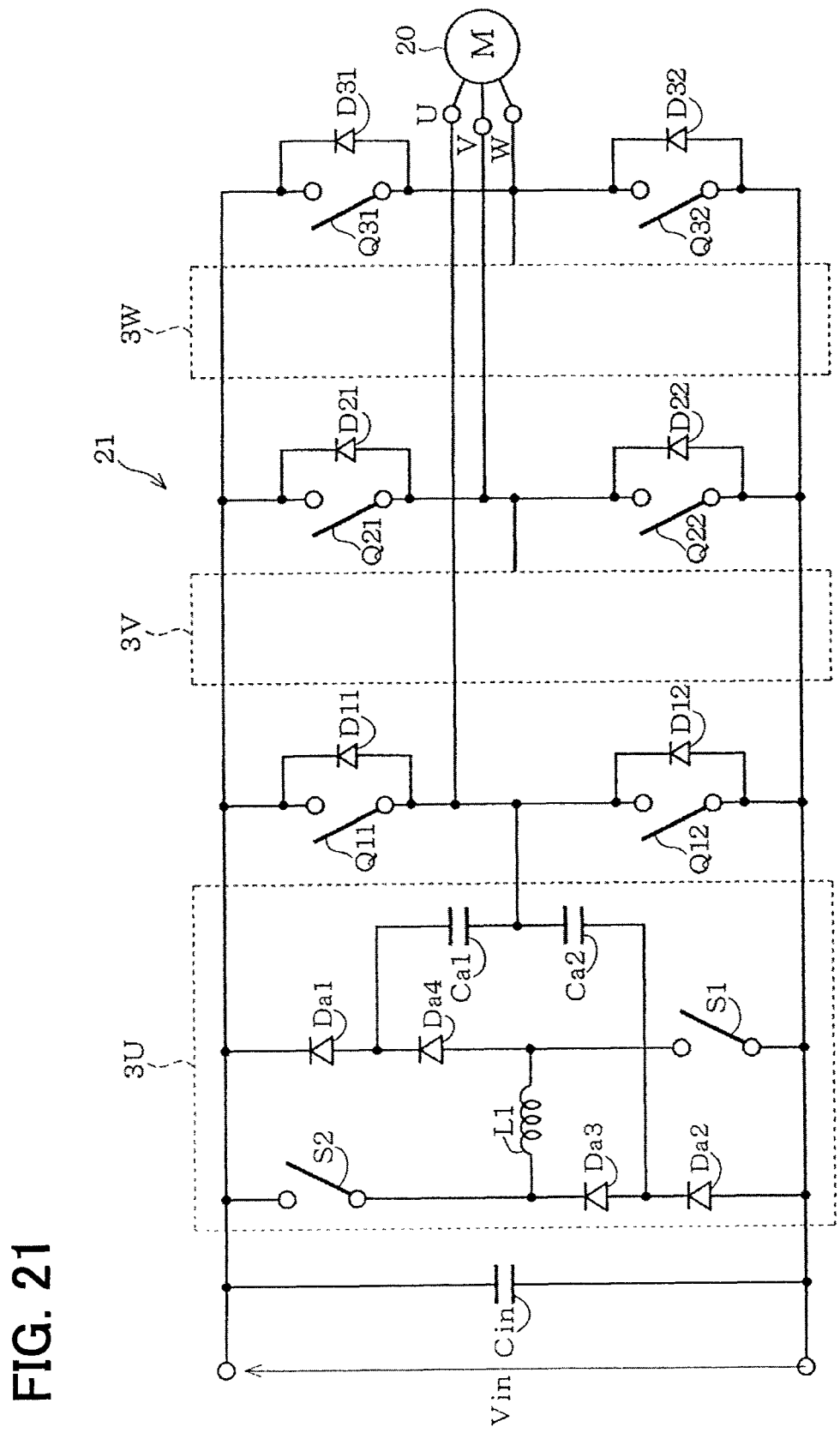
FIG. 21 is a circuit diagram, which corresponds to FIG. 1, according to a tenth embodiment applied to an inverter.

As shown in FIG. 21, an inverter circuit 21 for driving a motor 20 according to a tenth embodiment incorporates the loss reducing circuit 3. A series circuit formed of switching elements Q11 and Q12, a series circuit formed of switching elements Q21 and Q22 and a series circuit formed of switching elements Q31 and Q32 form arms of a U-phase, a V-phase and a W-phase of the motor 20, respectively. Common junctions (phase output terminals) of these series circuits are connected to stator coils (not shown) of the U-phase, the V-phase and the W-phase of the motor 20, respectively. Loss reducing circuits 3U, 3V and 3W for the respective phases are connected between DC bus lines of the inverter circuit 21. The common junction between the capacitors Ca1 and Ca2 is connected to the output terminal of each phase of the inverter circuit 21 (only the U-phase is shown).

That is, according to the tenth embodiment, the loss reducing circuit 3U, the switching elements Q11 and Q12 forming the U-phase arm and the stator coil (not shown) of the motor 20 connected to the common junction of the loss reducing circuit 3U and the switching elements Q11 and Q12 are arranged to provide an equivalent configuration as the bidirectional step-down chopper (switching power supply device) shown in FIG. 18. The loss reducing circuit 3 is operated each time the phase arms of the inverter circuit 21 perform respective switching operations. Thus the loss caused when the switching elements Q11 to Q32 are turned off can be reduced.

Eleventh Embodiment

Figure 22:
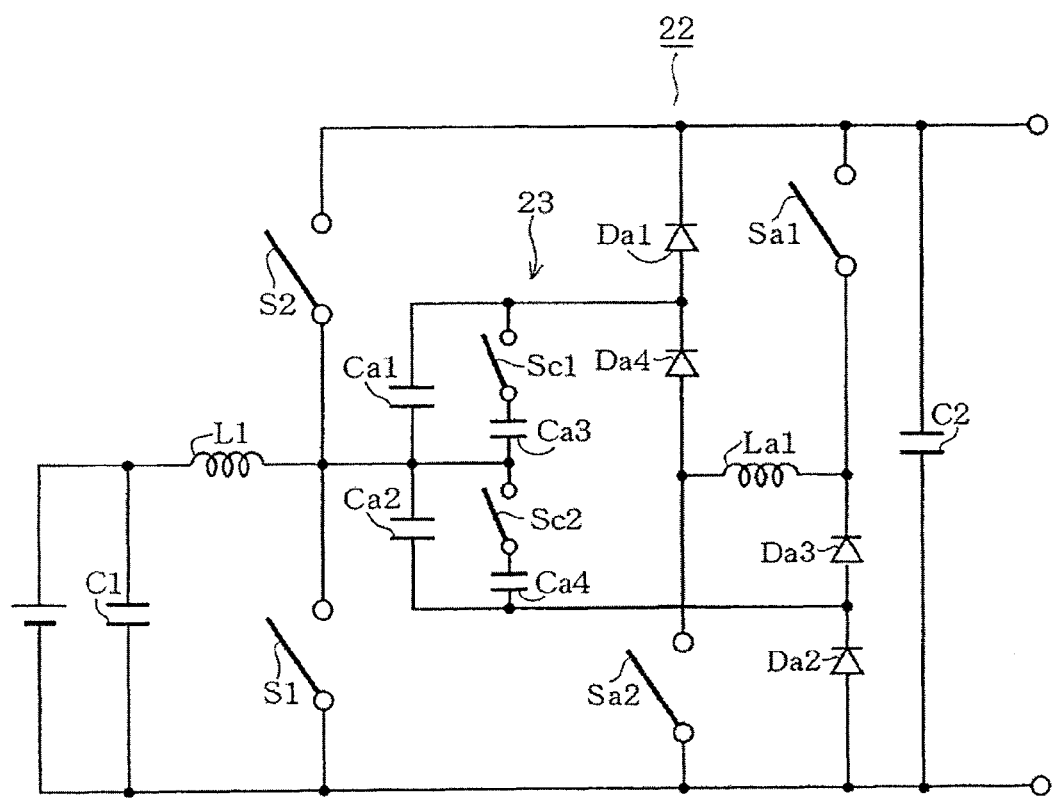
FIG. 22 is a circuit diagram, which corresponds to FIG. 1, according to an eleventh embodiment.

As shown in FIG. 22, a switching power supply device 22 according to an eleventh embodiment is provided with a series circuit, which is formed of a switching element Sc1, a capacitor Ca3, a switching element Sc2 and a capacitor Ca4. This series circuit is connected in parallel to the series circuit formed of the capacitors Ca1 and Ca2 in the switching power supply device 4 according to the first embodiment. This configuration provides a loss reducing circuit 23. According to the switching power supply device 22, capacitance of the capacitor Ca can be varied by turning on and off the switching elements Sc1 and Sc2. In this arrangement, the capacitors Ca1 and Ca3, the switching element Sc1, the capacitors Ca2 and Ca4 and the switching element Sc2 form a charge storing part.

That is, in a case that the absolute value of the current (reactor current) flowing through the reactor L1 is comparatively small, the capacitor Ca may not be charged fully while the switching element S1 or S2 is in the off-state if the capacitance of the capacitor Ca is too large. As a result, efficiency is likely to be lowered.

For this reason, while the absolute value of the reactor current is comparatively large, the switching elements Sc1 and Sc2 are turned on to connect the capacitors Ca3 and Ca4 in parallel to the capacitors Ca1 and Ca2, respectively, thereby to increase the capacitance.

In a case that the absolute value of the reactor current is comparatively small, the switching elements Sc1 and Sc2 are turned off to determine the capacitance by only the capacitors Ca1 and Ca2. With this control, the turn-off loss can be reduced without lowering the efficiency in correspondence to the magnitude of the reactor current. It is of course possible to vary the capacitance by connecting in parallel three or more series circuits, each of which is formed of the switching element Sci and the capacitor Cai.

Twelfth Embodiment

Figure 23:
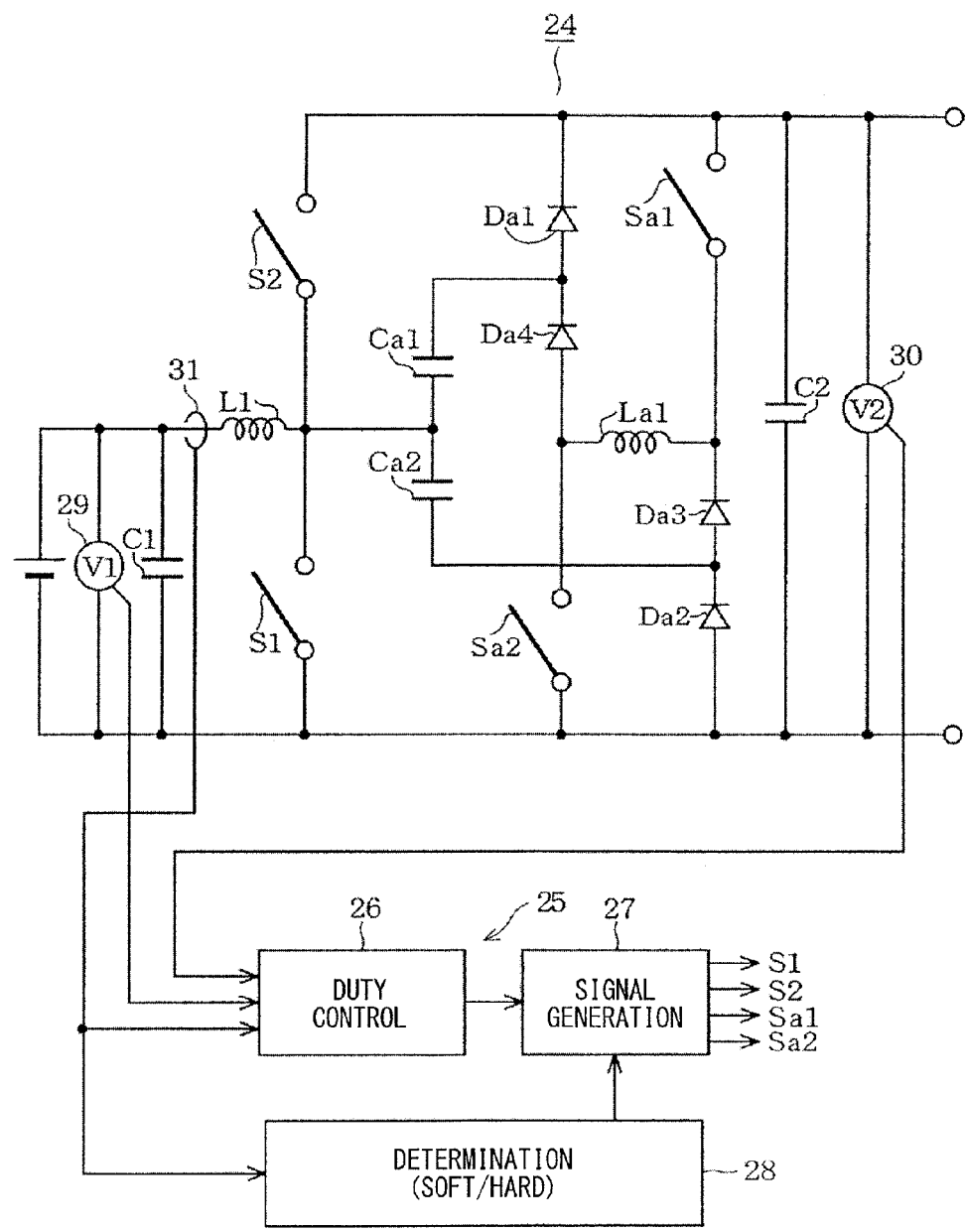
FIG. 23 is a circuit diagram, which corresponds to FIG. 1, according to a twelfth embodiment.

As shown in FIG. 23, a switching power supply device 24 according to a twelfth embodiment is provided with a control circuit 25 to the switching power supply device 4 according to the first embodiment. The control circuit 25 includes a duty control part 26, a signal generation part 27 and a switching mode determination part 28. A voltage sensor 29 is connected to both ends of the DC power source 1. A voltage sensor 30 is connected to both ends of the output-side capacitor C2. A current sensor 31 (current detection part) is provided at one terminal of the reactor L1, which is at the capacitor C1 side.

The duty control part 26 is inputted with sensor signals of the sensors 29 to 31. The determination part 28 is inputted with the sensor signal of the sensor 31.

The duty control part 26 generates duty commands for PWM control and outputs the same to the signal generation part 27. The duty commands are determined based on an input voltage V1 and an input voltage V2, which are detected by the voltage sensors 29 and 30, respectively, as well as a reactor current IL1, which is detected by the current sensor 31. The signal generation part 27 generates PWM signals in correspondence to the inputted duty commands and outputs the same to control on/off of the switching elements S1 and S2. The signal generation part 27 outputs control signals to turn on and off the switching elements Sa1 and Sa2 in correspondence to the PWM signals outputted to the switching elements S1 and S2.

The determination part 28 determines a switching mode to be selected based on the reactor current IL1 and outputs a mode switchover signal to the signal generation part 27. The switching mode is either one of a hard switching mode or a soft switching mode. The hard switching mode is for driving only the switching elements S1 and S2 to perform switching operations. The soft switching mode is for driving the switching elements Sa1 and Sa2 to turn on and off as well in correspondence to the switching operations in the hard switching mode. The signal generation part 27 controls the on/off operation of the switching elements in accordance with the mode indicated by the mode switchover signal.

Figure 24:
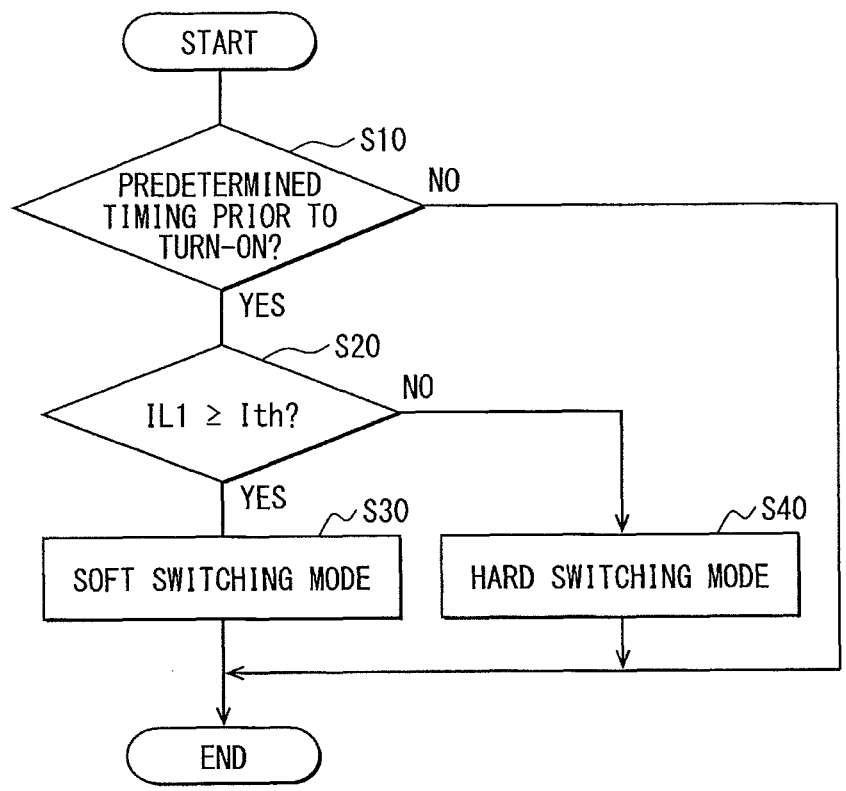
FIG. 24 is a flowchart showing control processing in the twelfth embodiment.

An operation of the twelfth embodiment will be described next. As shown in FIG. 24, the determination part 28 checks (S10) whether it is a predetermined timing set to be prior to turning on the switching element S1 or S2. This predetermined timing is set from a timing of change of the reactor current IL1 from an increase to a decrease as a start time. When the determination part 28 determines that it is the predetermined timing (YES), the determination part 28 checks (S20) whether the absolute value of the reactor current IL1 at that time is equal to or larger than a threshold value Ith. When the check result indicates IL1≥Ith (YES), the determination part 28 designates the soft switching mode (S30). When the check result indicates IL1<Ith (NO), the determination part 28 designates the hard switching mode (S40).

That is, under a condition that the absolute value of the reactor current IL1 is relatively small, namely the input current is small, the losses caused by the switching elements S1 and S2 are usually small. For this reason, when the switching elements Sa1 and Sa2 are also turned on and off, the loss caused by supplying a current to the loss reduction circuit may exceed effect of reduction of loss of the main switching elements S1 and S2. As a result, the efficiency is likely to be lowered. For this reason, when the absolute value of the reactor current IL1 exceeds the threshold value Ith, only the switching element S1 or S2 is driven to perform the switching operation so that the efficiency will not be lowered. It is noted that the current, which the current sensor 31 detects, is not limited to the reactor current but may be an input current at the positive terminal of the DC power source 1, an output current of the switching power supply device 24, or a collector current or an emitter current of the switching element S1 and/or S2.

As described above, according to the twelfth embodiment, the current sensor 31 is provided for detecting the reactor current and the determination part 28 stops controlling the switching elements Sa1 and Sa2 to turn on when the absolute value of the reactor current is lower than the predetermined threshold current. It is thus possible to suppress an unnecessary increase of loss caused by the switching operations of the switching elements Sa1 and Sa2 under the condition that the turn-off loss need not be reduced.

The switching power supply device is not limited to only the embodiments described above and shown in the drawings but may be modified as follows.

In place of the current circulating element, a current circulating circuit formed of plural elements may be arranged. Each of such an element and circuit form a current circulating part. In place of the current path forming element, a current path forming circuit may be arranged. Each of such an element and circuit form a current path forming part and may be any circuits, which realize the current supply patterns in the operation states in the above-described embodiments. Thus, analog switches may be used for example.

The fourth, fifth and sixth embodiments may be applied to other arbitrary embodiments.

The switching element is not limited to the IGBT or the MOSFET but may be a thyristor or a bipolar transistor.

In the above-described embodiments, the switching elements Sa1 and Sa2 of the loss reduction circuit are assumed to be turned on before or at the same time as the main switching element S1 or S2 is turned on. However, the switching elements may be turned on differently, that is, in the arbitrary order. For example, in the first embodiment, the switching elements Sa1 and Sa2 may be turned on after turning on the main switching element S1 or S2, and after a short while the switching elements Sa1 and Sa2 may be turned off. This order of switching also provides the similar advantage as the first embodiment. Further, in the second embodiment, the switching element Sa1 or Sa2 may be turned on before turning on the main switching element S1 or S2, and the switching element Sa1 or Sa2 may be turned off after the main switching element is turned off.

What is claimed is:

1. A power converter comprising:
   a main inductor;
   a main series circuit formed of a current supply control element and either a further current supply control element or a rectifying element connected to the current supply control element in series to the current supply control element at a common junction, which is connected to one end of the main inductor;
   a charge storing part, one end of which is connected to the common junction of the main series circuit;
   a current circulating part, which is formed of a current circulating element or a current circulating circuit and connected between an other end of the charge storing part and at least one end of the main series circuit, for allowing a current to flow from a low potential side to a high potential side and preventing a current from flowing from the high potential side to the low potential side;
   an auxiliary inductor, one end of which is connected to the other end of the charge storing part; and
   an auxiliary switching element connected between an other end of the auxiliary inductor and one end of the main series circuit, the auxiliary switching element forming a loop path, which includes the current circulating part and the auxiliary inductor, when turned on.

2. The power converter according to claim 1, further comprising: a current path forming part, which is formed of a current path forming element or a current path forming circuit and connected in series with the auxiliary switching element, the current path forming part allowing a current to flow from the low potential side to the high potential side and preventing a current from flowing from the high potential side to the low potential side, wherein a series circuit formed of the auxiliary switching element and the current path forming part is connected in parallel to the main series circuit.

3. The power converter according to claim 2, further comprising:
a second auxiliary switching element connected in series with the current circulating part in addition to the auxiliary switching element, which forms a first auxiliary switching element,
wherein a series circuit of the current circulating part and the second auxiliary switching element is connected in parallel to the main series circuit.

4. The power converter according to claim 3, further comprising: a second current path forming part connected between a junction of a first current circulating part, which is comprised of the current circulating part, and a first charge storing part, which is comprised of the charge storing part, and a junction of the auxiliary inductor and the second auxiliary switching element, and which allows a current to flow from the low potential side to the high potential side and prevents a current from flowing from the high potential side to the low potential side; a second current circulating part connected between a first current path forming part, which is comprised of the current forming part, and one end of the main series circuit, to which the first current path forming part is connected, and which allows a current to flow from the low potential side to the high potential side and prevents a current from flowing from the high potential side to the low potential side; and a second charge storing part connected between the common junction of the main series circuit and a common junction of the first current path forming part and the second current circulating part.

5. The power converter according to claim 4, wherein:
one of the first auxiliary switching element and the second auxiliary switching element, which is not connected in common to the current supply control element in an on-state, is controlled to turn off in a period that any one of the current supply control elements of the main series circuit is in the on-state.

6. The power converter according to claim 3, wherein:
the first auxiliary switching element and the second auxiliary switching element are controlled to turn on for a same period to supply a current to the auxiliary inductor to store magnetic energy in the auxiliary inductor, before any one of current supply control elements of the main series circuit is turned off; and
the first auxiliary switching element and the second auxiliary switching element are controlled to turn off concurrently to charge the charge storing part with the magnetic energy stored in the auxiliary inductor.

7. The power converter according to claim 6, wherein:
the first auxiliary switching element and the second auxiliary switching element are controlled to turn off concurrently in a period, in which any one of the current supply control elements is in an on-state.

8. The power converter according to claim 2, further comprising: a second auxiliary switching element having a function of a first current path forming part, which is comprised of the current path forming part, with respect to turning on and off the first auxiliary switching element, the second auxiliary switching element being connected in series with the first auxiliary switching element, a series connection of the first auxiliary switching element and the second auxiliary switching element being connected in parallel to the main series circuit, a first auxiliary rectifying part provided between a junction of a first current circulating part, which is comprised of the current circulating part, and a first charge storing part, which is comprised of the charge storing part, and the auxiliary inductor, the first auxiliary rectifying part allowing a current to flow from the low potential side to the high potential side and preventing a current from flowing from the high potential side to the low potential side; a series circuit of a second current circulating part and a second current circulating part, the series circuit being provided to connect a junction of the first auxiliary rectifying part and the auxiliary inductor and one end of the main series circuit and allowing a current to flow from the low potential side to the high potential side and preventing a current from flowing from the high potential side to the low potential side; and a second charge storing part connected between the junction of the second auxiliary rectifying part and the second current circulating part and the common junction of the main series circuit.

9. The power converter according to claim 8, wherein:
one of the first auxiliary switching element and the second auxiliary switching element, which is not connected in common to the current supply control element in an on-state, is controlled to turn off in a period that any one of the current supply control elements of the main series circuit is in the on-state.

10. The power converter according to claim 1, wherein: the charge storing part is comprised of a plurality of charge storing elements and at least one switching element; and the charge storing part is configured to have a capacitance, which is varied by controlling an on-state of the switching element.

11. The power converter according to claim 1, wherein:
the auxiliary switching element is controlled to turn on for charging the charge storing part through a path, which supplies the current to the auxiliary inductor; and
the auxiliary switching element is controlled to turn off from an on-state for continuing charging the charge storing part with magnetic energy stored in the auxiliary inductor.

12. The power converter according to claim 1, wherein:
the auxiliary switching element is controlled to be in an on-state for a fixed period.

13. The power converter according to claim 1, further comprising:
a current detecting part for detecting a current of the main inductor directly or indirectly by estimation from a current of other circuit parts,
wherein the auxiliary switching element is controlled to remain in an off-state, when the current of the main inductor is less than a predetermined threshold value.

14. The power converter according to claim 1, wherein:
the current path forming part and the current circulating part are all formed of diodes.

15. The power converter according to claim 1, wherein:
the current circulating part is a switching element.

* * * * *